US012600924B2

(12) United States Patent
Dhawan et al.

(10) Patent No.: US 12,600,924 B2
(45) Date of Patent: Apr. 14, 2026

(54) NON-CATIONIC SOFTENERS AND METHODS OF USE

(71) Applicant: ECOLAB USA INC., Saint Paul, MN (US)

(72) Inventors: Ashish Dhawan, Saint Paul, MN (US); Yiqing Chen, Saint Paul, MN (US); Carter M. Silvernail, Saint Paul, MN (US); Lee Monsrud, Saint Paul, MN (US); Gary Samuel Furman, Jr., St. Chares, IL (US); Marisa Alves Da Rocha, Rijnsburg (NL)

(73) Assignee: ECOLAB USA INC., Saint Paul, MN (US)

( * ) Notice: Subject to any disclaimer, the term of this patent is extended or adjusted under 35 U.S.C. 154(b) by 952 days.

(21) Appl. No.: 17/645,560

(22) Filed: Dec. 22, 2021

(65) Prior Publication Data

US 2022/0204889 A1 Jun. 30, 2022

Related U.S. Application Data

(60) Provisional application No. 63/199,408, filed on Dec. 23, 2020.

(51) Int. Cl.

| | |
|---|---|
| ***C11D 3/30*** | (2006.01) |
| ***C11D 3/00*** | (2006.01) |
| ***C11D 3/20*** | (2006.01) |
| ***C11D 3/37*** | (2006.01) |
| ***D06M 13/11*** | (2006.01) |
| ***D06M 13/332*** | (2006.01) |
| ***D21H 17/06*** | (2006.01) |
| ***D21H 17/07*** | (2006.01) |
| ***D21H 17/50*** | (2006.01) |
| ***D21H 17/56*** | (2006.01) |

(52) U.S. Cl.

CPC .............. *C11D 3/30* (2013.01); *C11D 3/0015* (2013.01); *C11D 3/2096* (2013.01); *C11D 3/3723* (2013.01); *D06M 13/11* (2013.01); *D06M 13/332* (2013.01); *D21H 17/06* (2013.01); *D21H 17/07* (2013.01); *D21H 17/56* (2013.01); *C11D 2111/12* (2024.01); *D06M 2200/50* (2013.01)

(58) Field of Classification Search

CPC ....... C11D 3/30; C11D 3/0015; C11D 3/2096; C11D 2111/12; D06M 13/11; D06M 13/332; D06M 2200/50; D21H 17/06; D21H 17/07; D21H 17/56; D96M 13/11; D96M 13/332

USPC .............................................................. 8/196

See application file for complete search history.

(56) References Cited

U.S. PATENT DOCUMENTS

| | | | | |
|---|---|---|---|---|
| 3,108,011 | A | 10/1963 | Frotscher | |
| 3,803,036 | A | 4/1974 | Sundby et al. | |
| 3,959,378 | A | 5/1976 | Eckert | |
| 4,049,557 | A | 9/1977 | Wixon | |
| 4,214,038 | A | 7/1980 | McCarty et al. | |
| 5,419,842 | A | 5/1995 | Crutzen | |
| 5,698,513 | A | 12/1997 | Schulz et al. | |
| 6,521,589 | B2 | 2/2003 | Demeyere et al. | |
| 6,746,623 | B2 * | 6/2004 | Slone | B01D 53/1493 252/189 |
| 6,916,780 | B2 | 7/2005 | Fry et al. | |
| 7,279,455 | B2 | 10/2007 | Kieffer et al. | |
| 7,456,145 | B2 | 11/2008 | Lentsch et al. | |
| 8,026,206 | B2 | 9/2011 | Sajic et al. | |
| 10,113,139 | B2 | 10/2018 | Wetrosky et al. | |
| 10,233,407 | B2 | 3/2019 | Hodge et al. | |
| 2017/0051234 | A1 * | 2/2017 | Foster | C11D 3/349 |
| 2020/0071261 | A1 | 3/2020 | Dhawan et al. | |

FOREIGN PATENT DOCUMENTS

| | | | | |
|---|---|---|---|---|
| CA | 2438773 | C | 12/2008 | |
| DE | 1959651 | A1 | 6/1971 | |
| DE | 2126397 | A1 | 12/1972 | |
| EP | 0043046 | * | 1/1982 | D06M 13/322 |
| EP | 0043046 | A1 | 1/1982 | |
| EP | 0154918 | B1 | 11/1989 | |
| EP | 1277829 | A2 | 1/2003 | |
| EP | 2826917 | A1 | 1/2015 | |
| GB | 1030317 | A | 5/1966 | |
| GB | 1524911 | A | 9/1978 | |
| KR | 19940006255 | B1 | 7/1994 | |
| WO | WO-2005037974 | A2 * | 4/2005 | A01N 59/16 |
| WO | 2010053572 | A2 | 5/2010 | |
| WO | WO-2016081079 | A1 * | 5/2016 | C11D 1/62 |

OTHER PUBLICATIONS

"Forming handsheets for physical tests of pulp", TAPPI-T205, 26 pages, Jul. 11, 2006.
"Physical testing of pulp handsheets", TAPPI-T220, 6 pages, 2001.
"Standard conditioning and testing atmospheres for paper, board, pulp handsheets, and related products", TAPPI-402, 13 pages, Apr. 2013.
Wei et al., "Synthesis of multiblock linear polyether functional amino silicone softener and its modification of surface properties on cotton fabrics", Polym. Bull., vol. 76, pp. 447-467, 2019.

* cited by examiner

*Primary Examiner* — Amina S Khan
(74) *Attorney, Agent, or Firm* — McKee, Voorhees & Sease, PLC

(57) ABSTRACT

A composition comprising a non-cationic amine epoxide adduct is disclosed, along with methods of making the same. Use of a composition comprising a non-cationic amine epoxide adduct on textiles and paper, particularly woven textiles, tissues, and nonwoven textiles to soften the textiles and paper, along with methods of using a non-cationic amine epoxide adduct to treat a target, are also disclosed.

21 Claims, 3 Drawing Sheets

NON-CATIONIC SOFTENERS AND METHODS OF USE

CROSS REFERENCE TO RELATED APPLICATIONS

This application claims priority under 35 U.S.C. § 119 to provisional application Ser. No. 63/199,408 filed Dec. 23, 2020, which is herein incorporated by reference in its entirety including without limitation, the specification, claims, and abstract, as well as any figures, tables, or examples thereof.

TECHNICAL FIELD

The disclosure relates to non-cationic amine epoxide adduct along with methods of making and using the same as part of lubricating compositions for a given environment, or compositions for textiles or paper, for example woven textiles, and nonwoven textiles comprised of natural and/or synthetic raw materials, along with paper, including napkins and tissues such as facial and toilet tissues. More particularly, the disclosure relates to compositions comprising polyalkyleneamine epoxide adducts, and methods for treating a textile, paper, or surface with these softening or lubricating compositions.

BACKGROUND

There remains a commercial need for effective softening and lubricating compositions for treating textiles, surfaces, and water sources. Softening compositions, sometimes referred to as conditioning compositions, are generally used to deposit a composition onto a textile. The softening compound adheres to the textile, paper, or surface, promoting fabric softness and preventing wrinkles. A variety of textiles, papers, or surfaces benefit from softening. "Softness" refers to the tactile, perceived quality of the textile, paper, or surface, as discerned by users. Such tactile perceivable softness may be characterized by, but not limited to, resilience, flexibility, fluffiness, slipperiness, and smoothness and other subjective descriptions.

In industrial/institutional applications it is particularly difficult to develop a softening or lubricating composition that retains efficacy in the harsh use conditions without imparting negative effects on the textile, paper, or surface/water source. Fabrics utilized in industrial and institutional uses, for example hotels, hospitals and healthcare facilities, restaurants, health clubs, salons, retail stores, and the like, are typically laden with more extensive and stubborn soils compared to consumer or residential applications. In order to effectively remove soils, industrial detergent compositions are typically much more alkaline, typically having a pH of greater than about 9. Alkaline pH conditions inhibit the efficacy of many softening actives. Further, industrial dryers operate at substantially higher temperatures (e.g., between about 82° C. and about 132° C.) than those found in the consumer or residential market, which typically function at maximum temperatures of between about 48° C. and about 31° C. However, fabric softeners effective under alkaline conditions generally cause premature yellowing and/or degradation of the textiles, papers, or surfaces, thus requiring additional laundering and shortening the life of the fabric.

Given that many linens in the institutional and industrial sector are white, it is desirable to provide a fabric conditioning agent that does not cause significant yellowing or dulling of fabrics that are repeatedly washed and dried. Moreover, it is generally desirable for white laundry that is dried to remain white even after multiple drying cycles. That is, it is desirable that the fabric not yellow or dull after repeated cycles of drying.

Existing industrial compositions typically utilize cationic compounds, particularly quaternary ammonium compounds. For example, U.S. Pat. Nos. 10,233,407 and 10,113,139 rely on the combination of quaternary ammonium compounds such as methyl bis[ethyl(tallowate)]-2-hydroxyethyl ammonium methyl sulfate, diethyl ester dimethyl ammonium methyl sulfate, diethyl ester dimethyl ammonium chloride, methyl bis(hydr. tallow amidoethyl)-2-hydoxyethyl ammonium methyl sulfate, and the like with a silicone polymer to provide effective softening in industrial settings. U.S. Pat. No. 7,456,145 provides effective softening by utilizing ester quaternary ammonium compounds in combination with amide carriers. U.S. Pat. No. 8,026,206 similarly relies on the use of long chain quaternary ammonium compound to provide a low solids, high viscosity fabric softener with minimal polymer additives. In sum, conventional fabric softeners rely heavily on quaternary ammonium compounds.

However, quaternary ammonium compound fabric softeners have a number of disadvantages. Use of quaternary ammonium compounds carries a risk of toxicity to humans and aquatic organisms. This toxicity could lead to harmful effects on aquatic life in lakes, rivers, and other waters into which wastewater is deposited, as well as harmful effects associated with user handling of quat-containing products. Additionally, regulations regarding the use of quaternary ammonium compounds are becoming increasingly stringent. There is therefore a need to develop softening compounds which do not require quaternary ammonium compounds or a salt thereof.

Candidates such as neoalkane amides/neoalkanamides, glyceryl esters, silicones, cationic-anionic complexes, bentonite, and a variety of lubricants have been proposed as replacements for quaternary ammonium salts as the active component for compositions.

For example, U.S. Pat. No. 4,214,038 describes a composition comprising a fatty alkyl polyglycerol ester as the softening agent. However, the '038 patent only relates to dryer-added compositions used at relatively low temperatures and does not provide compositions effective under highly alkaline wash conditions or high temperature drying conditions. Similarly, U.S. Pat. No. 5,419,842 discusses the use of pentaerythritol actives as part of a composition. Although the compositions of the '842 are beneficially non-cationic, they are formulated into an emulsion which have poor stability: in particular, pentaerythritol begins to degrade at higher temperatures and the overall emulsion has poor shelf/storage stability over longer periods of time.

In addition to these deficiencies, many softening agents—both quaternary ammonium compounds and non-quaternary ammonium actives—are difficult to formulate into a stable solid form. Many preferred biodegradable softening actives have a low melting point and are semi-solid at room temperature; as such they suffer from "weeping" and sloughing when placed in a dispenser. An additional challenge in producing a solid softener composition is developing a formulation that will have an adequate dispense rate when sprayed with water. Many common actives for softening are hydrophobic and thus undesirably result in low dispensing rates. If the dispense rate is too slow, it will not be possible to deliver the required amount of formulation during the normal rinse cycle.

Therefore, there is still a need to develop stable, non-cationic, quaternary ammonium-free compositions which do not cause yellowing and provide substantially similar softening performance as existing fabric softeners.

Other objects, advantages and features will become apparent from the following specification taken in conjunction with the accompanying drawings.

BRIEF SUMMARY

In embodiments, amine epoxide adduct forming compositions are provided, wherein the compositions comprise a first reagent comprising an amine according to the formulas:

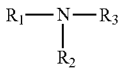

(I)

wherein $R_1$, $R_2$, and $R_3$ are each an alkyl group, an aliphatic group, an aryl group, or hydrogen;

$$R_1—R_2—N—R_5—N—R_3—R_4 \quad \text{(II)}$$

wherein $R_1$, $R_2$, $R_3$, and $R_4$ are each an alkyl group, an aliphatic group, an aryl group, or hydrogen, and wherein $R_5$ is an alkyl group, an aliphatic group, or an aryl group;

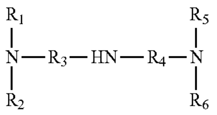

(III)

wherein $R_1$, $R_2$, $R_5$, and $R_6$ are each an alkyl group, an aliphatic group, an aryl group, or hydrogen, and wherein $R_3$ and $R_4$ are each an alkyl group, an aliphatic group, or an aryl group;

$$NH_2—[R^{10'}]_n—NH_2,\ [RNH]_n—RNH_2,\ H_2N—[RNH]_n—RNH_2 \quad \text{(IV)}$$

wherein $R^{10'}$ is a linear or branched, unsubstituted or substituted $C_2$-$C_{10}$ alkylene group, or a combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or a combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n is an integer of between 2-1,000,000;

$$NH_2(CH_2CH_2NH)_n—CH_2CH_2NH_2 \quad \text{(V)}$$

wherein n is an integer of between 2-105;

(V)

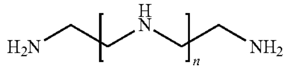

wherein n is an integer of between 1-100; or a combination thereof; and a second reagent comprising an epoxide according to the formula:

(VI)

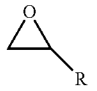

wherein R is an alkyl, alkylene, aliphatic or aryl group having a $C_8$-$C_{30}$ chain length; wherein the first reagent and the second reagent are contacted to form an amine epoxide adduct; and wherein the molar ratio of the epoxide to the amine is between about 1:20 to about 20:1.

In an embodiment, the amine according to formula (V) is amine according to the formula:

(VII)

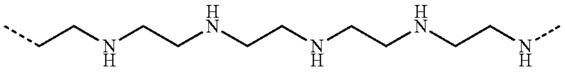

;

(VIII)

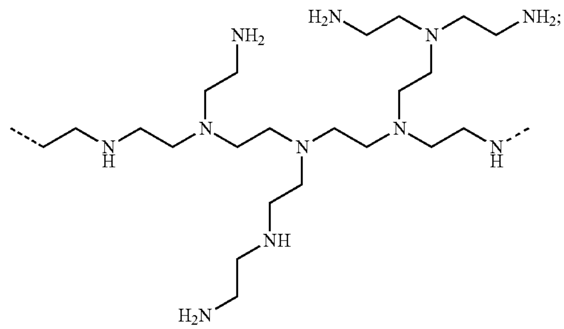

;

(IX)

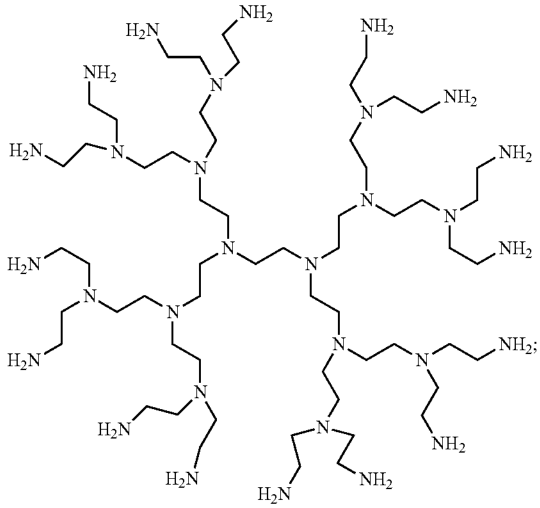

;

or a combination thereof.

In an embodiment, the amine epoxide adduct is a compound according to the formula:

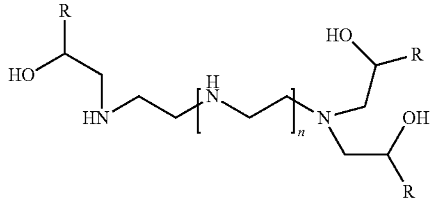

wherein R is an alkyl group or a —$(CH_2)_n$ O-alkyl, and wherein n is an integer between 1-1000.

According to some embodiments, the amine epoxide adduct is a compound according to the following formulas:

(X)

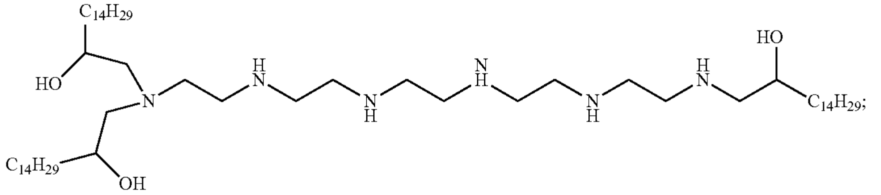

(XI)

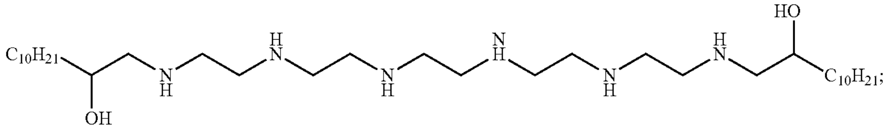

(XII)

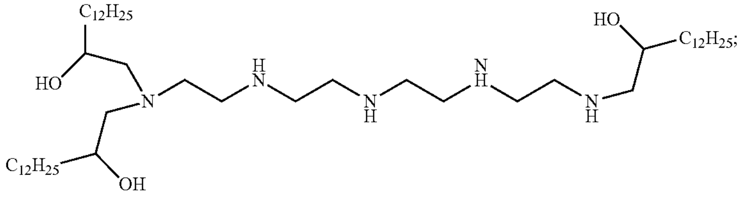

(XIII)

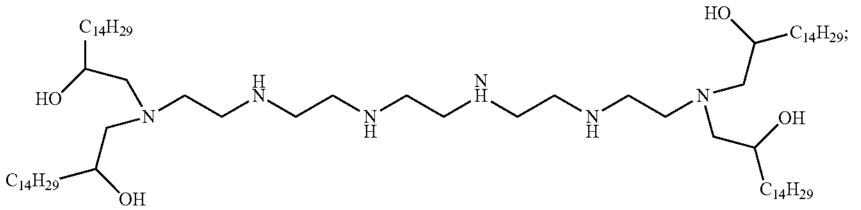

or a combination thereof.

In a preferred embodiment, the amine according to formula (V) is pentaethylenehexamine, triethylenetetramine, tetraethylenepentamine, diethylenetriamine, hexaethyleneheptamine, tetraethylenepentamine, or a combination thereof. In a preferred embodiment, the epoxide according to formula (VI) is 1,2-epoxydodecane, 1,2-epoxytetradecane, 1,2-epoxyhexadecane, 1,2-epoxyoctadecane, a $C_8$-$C_{10}$ alkyl glycidyl ether, a $C_{12}$-$C_{14}$ alkyl glycidyl ether, or a combination thereof.

In some embodiments, composition comprises from about 10 wt. % to about 80 wt. % of the amine epoxide adduct, and from about 0 wt. % to about 20 wt. % of the one or more surfactants.

In an embodiment, the composition is free of quaternary ammonium compounds.

According to an embodiment, the composition further comprises an additional functional ingredient, wherein the additional functional ingredient comprises an alkalinity source, defoaming agent, anti-redeposition agent, solubility modifier, dispersant, stabilizing agent, sequestrant, chelating agent, surfactant, anti-wrinkling agent, optical brightener, dye, rheology modifier, thickener, hydrotrope, coupler, buffer, solvent, enzyme, soil-release agent, dye scavenger, crisping agent, antimicrobial agent, fungicide, antioxidant, or a combination thereof.

Also provided herein is a paper comprising the amine epoxide adduct forming composition comprising an amine and an epoxide described herein. Further provided is a textile comprising the amine epoxide adduct forming composition comprising an amine and an epoxide described herein.

The disclosure also relates to methods of generating an amine epoxide adduct comprising contacting a first reagent comprising an amine and a second reagent comprising an epoxide under conditions in which an epoxy group of the epoxide reacts with one or more terminal amino groups of the amine, wherein the amine is a compound according to the formulas:

(I)

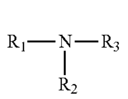

wherein $R_1$, $R_2$, and $R_3$ are each an alkyl group, an aliphatic group, an aryl group, or hydrogen;

$$R_1—R_2—N—R_5—N—R_3—R_4 \quad (II)$$

wherein $R_1$, $R_2$, $R_3$, and $R_4$ are each an alkyl group, an aliphatic group, an aryl group, or hydrogen, and wherein $R_5$ is an alkyl group, an aliphatic group, or an aryl group;

(III)

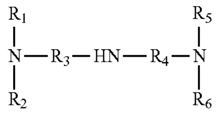

wherein $R_1$, $R_2$, $R_5$, and $R_6$ are each an alkyl group, an aliphatic group, an aryl group, or hydrogen, and wherein $R_3$ and $R_4$ are each an alkyl group, an aliphatic group, or an aryl group;

$NH_2—[R^{10'}]_n—NH_2$, $(RNH)_n—RNH_2$, $H_2N—(RNH)_n—RNH_2$ (IV)

wherein $R^{10'}$ is a linear or branched, unsubstituted or substituted $C_2$-$C_{10}$ alkylene group, or a combination thereof; R is $—CH_2—$, $—CH_2CH_2—$, $—CH_2CH_2CH_2—$, $—CH(CH_3)CH_2—$, a linear or branched, unsubstituted or substituted $C_4$-$C_{10}$ alkylene group, or a combination thereof; R' is $—CH_2—$, $—CH_2CH_2—$, $—CH_2CH_2CH_2—$, $—CH(CH_3)CH_2—$, a linear or branched, unsubstituted or substituted $C_4$-$C_{10}$ alkyl group, $RNH_2$, $RNHRNH_2$, or $RN(RNH_2)_2$; and n is an integer of between 2-1,000,000;

$NH_2(CH_2CH_2NH)_n—CH_2CH_2NH_2$ (V)

wherein n is an integer of between 2-105;

(V)

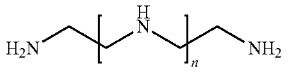

wherein n is an integer of between 1-100; or a combination thereof; and the epoxide is a compound according to the formula:

(VI)

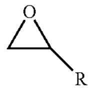

wherein R is an alkyl, alkylene, aliphatic or aryl group having a $C_8$-$C_{30}$ chain length.

In an embodiment of the method, the contacting step induces one or more terminal amino groups of the amine to open the epoxy ring of the epoxide.

According to an embodiment, the amine epoxide adduct formed by the method is a compound according to the formula:

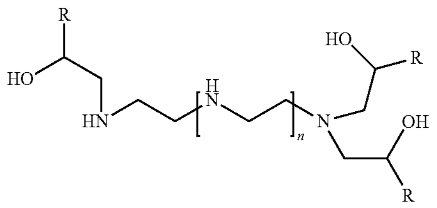

wherein R is an alkyl group or a $—(CH_2)_n$ O-alkyl, and wherein n is an integer between 1-1000. In a further embodiment, the amine epoxide adduct is a compound according to the following formulas:

(X)

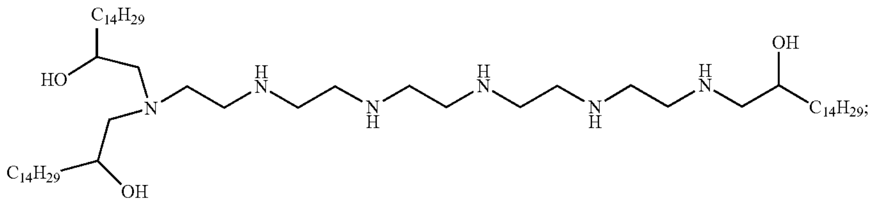

(XI)

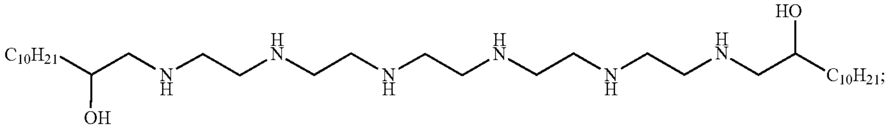

(XII)

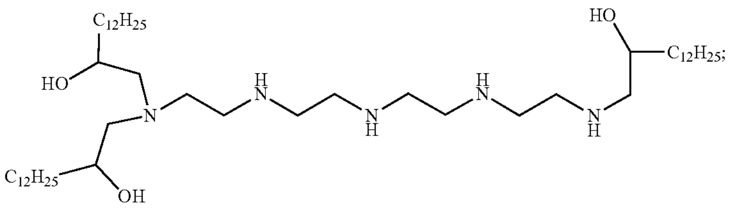

-continued (XIII)

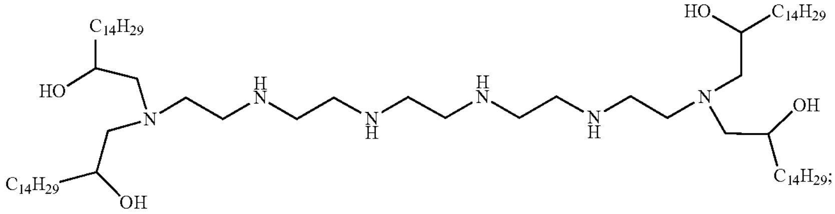

or a combination thereof.

The disclosure also relates to methods of softening a target comprising: (a) dispersing an amine epoxide adduct forming composition in water to form a use solution; and (b) contacting a target with the use solution; wherein the amine epoxide adduct forming composition comprises a first reagent comprising an amine according to the formulas:

(I)

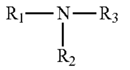

wherein $R_1$, $R_2$, and $R_3$ are each an alkyl group, an aliphatic group, an aryl group, or hydrogen;

$$R_1—R_2—N—R_5—N—R_3—R_4 \quad \text{(II)}$$

wherein $R_1$, $R_2$, $R_3$, and $R_4$ are each an alkyl group, an aliphatic group, an aryl group, or hydrogen, and wherein $R_5$ is an alkyl group, an aliphatic group, or an aryl group;

(III)

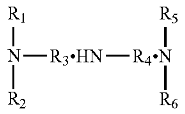

wherein $R_1$, $R_2$, $R_5$, and $R_6$ are each an alkyl group, an aliphatic group, an aryl group, or hydrogen, and wherein $R_3$ and $R_4$ are each an alkyl group, an aliphatic group, or an aryl group;

$$NH_2—[R^{10'}]_n—NH_2,\ (RNH)_n—RNH_2,\ H_2N—(RNH)_n—RNH_2 \quad \text{(IV)}$$

wherein $R^{10'}$ is a linear or branched, unsubstituted or substituted $C_2$-$C_{10}$ alkylene group, or a combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or a combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n is an integer of between 2-1,000,000;

$$NH_2(CH_2CH_2NH)_n—CH_2CH_2NH_2 \quad \text{(V)}$$

wherein n is an integer of between 2-105;

(V)

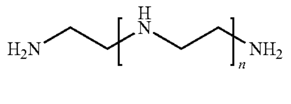

wherein n is an integer of between 1-100; or a combination thereof; and a second reagent comprising an epoxide according to the formula:

(VI)

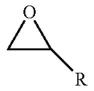

wherein R is an alkyl, alkylene, aliphatic or aryl group having a $C_8$-$C_{30}$ chain length.

In an embodiment, the amine used in the methods of softening a target is pentaethylenehexamine, triethylenetetramine, tetraethylenepentamine, diethylenetriamine, hexaethyleneheptamine, tetraethylenepentamine, or a combination thereof. In an embodiment, the epoxide is 1,2-epoxydodecane, 1,2-epoxytetradecane, 1,2-epoxyhexadecane, 1,2-epoxyoctadecane, a $C_8$-$C_{10}$ alkyl glycidyl ether, a $C_{12}$-$C_{14}$ alkyl glycidyl ether, or a combination thereof.

According to an embodiment, the target is a textile. In a preferred embodiment, the textile is a fabric used in a hotel, hospital, healthcare facility, restaurant, health club, salon, retail store, or a combination thereof.

According to a further embodiment, the target is a pulp. In a further embodiment, the pulp comprises eucalyptus, softwood, cellulose fibers, wood fibers, or a combination thereof.

According to some embodiments, the method of softening a target further comprises the step (c) of forming a paper from the pulp. In an embodiment, the paper is a tissue, napkin, or paper towel.

In an embodiment, the amine epoxide adduct increases bulk softness of the paper without substantial tensile strength loss. In an embodiment, the amine epoxide adduct increases bulk softness of the tissue as compared to a tissue not treated with the amine epoxide adduct.

While multiple embodiments are disclosed, still other embodiments of the present disclosure will become apparent based on the detailed description, which shows and describes illustrative embodiments of the disclosure. Each feature of the technology described herein may be combined with any one or more other features of the disclosure, e.g., the methods may be used with any composition described herein. Accordingly, the drawings and detailed description are to be regarded as illustrative in nature and not restrictive.

Figure 1:
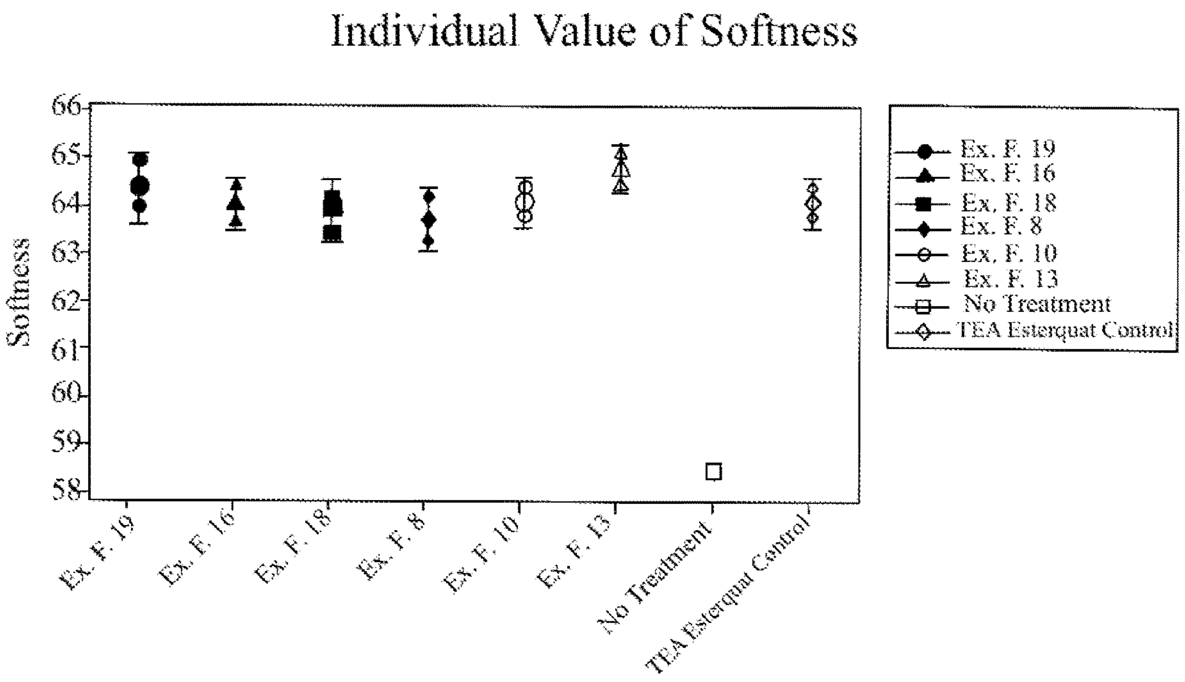
FIG. 1 depicts an evaluation of various non-cationic, non-quaternary ammonium softening actives that provide either substantially the same or superior performance as a traditional quaternary ammonium softening agent when dosed at equivalent levels.

Various embodiments of the present compositions and methods will be described in detail with reference to the drawings, wherein like reference numerals represent like parts throughout the several views. Reference to various embodiments does not limit the scope of the invention. Figures represented herein are not limitations to the various embodiments depicted and are presented for example illustration.

DETAILED DESCRIPTION OF THE PREFERRED EMBODIMENTS

The compositions and methods described herein are not limited to particular compositions and methods of employing the same, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Unless indicated otherwise, "or" can mean any one alone or any combination thereof, e.g., "A, B, or C" means the same as any of A alone, B alone, C alone, "A and B," "A and C," "B and C" or "A, B, and C." Further, all units, prefixes, and symbols may be denoted in its SI accepted form.

Numeric ranges recited within the specification are inclusive of the numbers defining the range and include each integer within the defined range. Throughout this disclosure, various embodiments of the compositions and methods are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

So that the present disclosure may be more readily understood, certain terms are first defined. Unless defined otherwise, all technical and scientific terms used herein have the same meaning as commonly understood by one of ordinary skill in the art. Many methods and materials similar, modified, or equivalent to those described herein can be used in the practice of the embodiments without undue experimentation, the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients of the lubricant composition as a percentage minus inert ingredients such as water or salts.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic, and random symmetries, and combinations thereof. Furthermore, unless otherwise specifically limited, the term "polymer" shall include all possible geometrical configurations of the molecule.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxy carbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Example heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "poly," as used in connection with, for example, terms such as "polyol," "polyamine," etc., refer to substances that formally contain two or more of the functional groups occurring in their name per molecule.

The term "amine hydrogen" refers to the hydrogen atoms of primary and secondary amino groups.

"Amine hydrogen equivalent weight" refers to the percentage by weight of a curing agent or an amine per amine hydrogen present in the curing agent or in the amine.

"Molecular weight" in the present document is understood as the molar mass (in grams per mol) of a molecule.

"Average molecular weight" refers to the number-average molecular weight $M_n$ of a mixture of molecules.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %. In a further embodiment, the amount of the component is 0 wt. %, or free of the component. Unless explicitly included in an example composition or embodiment, the compositions of the disclosure may optionally be free or substantially free of any component.

Relatedly, the compositions and methods described herein may comprise, consist essentially of, or consist of the components and ingredients as well as other ingredients described herein. As used herein, "consisting essentially of" means that the compositions and methods may include additional steps, components, or ingredients, but only if the additional steps, components, or ingredients do not materially alter the basic and novel characteristics of the claimed compositions and methods. It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed, and arranged, adapted, and configured, adapted, constructed, manufactured, and arranged, and the like.

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

As used herein, the term "textile" refers to both unprocessed and processed fibers, strands, yarns, woven or knit fabrics, non-woven fabrics, garments, linens, laundry articles, and the like. Non-limiting examples of textile materials that can be treated with the compositions include absorbent towels, cloths, or wipes, laundry articles; linens; nylon, polyesters; leathers and the like. Textiles can include textiles for personal care products, industrial or cleaning applications and the like. Textiles may be re-usable or disposable.

The term "paper" as used herein refers to tissues, such as facial tissues and toilet tissues; papers, especially disposable papers including disposable napkins, paper towels, and personal care papers. Papers can be re-usable or disposable.

The term "laundry," "laundry article," "linen," and/or "fabric," as used herein refers to items or articles that are cleaned in a laundry washing machine. In general, laundry refers to any item or article made from or including natural fabrics, synthetic fabrics, woven fabrics, non-woven fabrics, and knitted fabrics. The textile, paper, or surface materials can include natural or synthetic fibers such as silk fibers, linen fibers, cotton fibers, hemp fibers, angora fibers, bamboo fibers, polyester fibers, polyamide fibers such as nylon, acrylic fibers, acetate fibers, wool, rayon, cashmere, satin, spandex, and blends thereof, including cotton and polyester blends. The fibers can be treated or untreated. Example treated fibers include those treated for flame retardancy. It should be understood that the term "linen" describes a type of material derived from flax plants which is often used in certain types of laundry items including bed sheets, pillowcases, towels, table linen, tablecloth, bar mops and uniforms.

As used herein, the term "water" for treatment according to the invention includes a variety of sources, such as freshwater, pond water, sea water, salt water or brine source, brackish water, recycled water, or the like. Waters are also understood to optionally include both fresh and recycled water sources (e.g., "produced waters"), as well as any combination of waters for treatment according to the invention. In some embodiments, produced water (or reuse water) refers to a mixture of water that comprises both water recycled from previous or concurrent oil- and gas-field operations, e.g., fracking, and water that has not been used in oil- and gas-field operations, e.g., fresh water, pond water, sea water, etc.

As used herein, the term "sloughing" refers to large pieces or chunks of material falling out of or away from a solid composition during dispensing when water is used to bring a portion of a solid composition into an aqueous solution for dispensing. The pieces or chunks of solid material fall off the solid during or between dispensing in an unintentional and/or uncontrolled manner when the solid composition is softened by the dispensing water.

Embodiments

Example ranges of the materials used to generate a polyalkyleneamine according to the disclosure are shown in Table 1.

TABLE 1

| Material | First Example Range (g) | Second Example Range (g) | Third Example Range (g) | Fourth Example Range (g) |
|---|---|---|---|---|
| Amine | 1-75 | 3-60 | 5-50 | 10-50 |
| Epoxide | 15-250 | 20-200 | 25-150 | 35-150 |
| Ratio | 1:1 Amine:Epoxide | 1:2 Amine:Epoxide | 1:5 Amine:Epoxide | 1:10 Amine:Epoxide |

Upon generation of an amine epoxide adduct according to the disclosure, the amine may be incorporated into a solid composition in accordance with Table 2.

TABLE 2

| Material | First Example Range wt. % | Second Example Range wt. % | Third Example Range wt. % | Fourth Example Range wt. % |
|---|---|---|---|---|
| Amine Epoxide Adduct | 10-80 | 10-60 | 15-60 | 20-60 |
| Softening Booster | 0-20 | 0.5-20 | 1-15 | 1-10 |
| Processing Aid | 0-10 | 0.5-7 | 0.5-5 | 1-4.5 |
| Solidification Aid | 1-25 | 2-25 | 5-25 | 10-25 |
| Surfactants | 0-20 | 0.1-15 | 0.5-15 | 1-12 |
| Additional Functional Ingredients | 0-60 | 0.1-60 | 1-60 | 1-60 |

Additionally, upon generation of an amine epoxide adduct according to the disclosure, the amine may be incorporated into a liquid composition in accordance with Table 3.

TABLE 3

| Material | First Example Range wt. % | Second Example Range wt. % | Third Example Range wt. % | Fourth Example Range wt. % |
|---|---|---|---|---|
| Polyamine-Epoxide Adduct | 10-80 | 10-60 | 15-60 | 20-60 |
| Softening Booster | 0-20 | 0.5-20 | 1-15 | 1-10 |
| Processing Aid | 0-25 | 0-20 | 0-15 | 1-10 |
| Surfactants | 0-20 | 0.1-15 | 0.5-15 | 1-12 |
| Solvent | 1-90 | 5-60 | 10-50 | 30-40 |
| Additional Functional Ingredients | 0-70 | 0.1-60 | 1-60 | 5-60 |

Amine

The compositions of the application preferably include one or more amines, preferably one or more polyamines, and more preferably one or more polyalkylamines. Amines useful for the compositions of the application may be primary, secondary, or tertiary, aliphatic, cycloaliphatic, aliphatic, aromatic, mono-, di-, tri-, and/or polyamines. The one or more amines are reacted with one or more epoxides to generate an amine epoxide adduct.

In a preferred embodiment, the amine is pentaethylenehexamine, triethylenetetraamine, tetraethylenepentamine, diethylenetriamine, hexaethyleneheptamine, or a combination thereof.

In an embodiment, the amine is a monoamine according to the formula:

[Formula I]

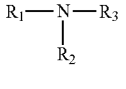

wherein $R_1$, $R_2$, and $R_3$ are each an alkyl group, an aliphatic group, an aryl group, or hydrogen. In an embodiment, $R_1$, $R_2$, and $R_3$ each comprise 2 to 6 carbon atoms. In a further embodiment, the amine is a diamine according to the formula:

$R_1—R_2—N—R_5—N—R_3—R_4$ [Formula II]

wherein $R_1$, $R_2$, $R_3$, and $R_4$ are each an alkyl group, an aliphatic group, an aryl group, or hydrogen, and wherein $R_5$ is an alkyl group, an aliphatic group, or an aryl group. In an embodiment, $R_1$, $R_2$, $R_3$, $R_4$, and $R_4$ each comprise 2 to 6 carbon atoms. In a further embodiment, the amine is a triamine according to the formula:

[Formula III]

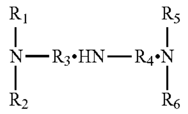

wherein $R_1$, $R_2$, $R_5$, and $R_6$ are each an alkyl group, an aliphatic group, an aryl group, or hydrogen, and wherein $R_3$ and $R_4$ are each an alkyl group, an aliphatic group, or an aryl group. In an embodiment, $R_1$, $R_2$, $R_3$, $R_4$, $R_5$, and $R_6$ each comprise 2 to 6 carbon atoms.

In a still further embodiment, the amine is a polyamine. The polyamine may be a polymerization of any of the aforementioned monoamine, diamines, or triamines. A polyamine can have, but is not limited to, a generic formula of $NH_2—[R^{10'}]_n—NH_2$, $(RNH)_n—RNH_2$, $H_2N—(RNH)_n—RNH_2$, or $H_2N—(RN(R'))_n—RNH_2$, wherein $R^{10'}$ is a linear or branched, unsubstituted or substituted $C_2$-$C_{10}$ alkylene group, or a combination thereof; R is $—CH_2—$, $—CH_2CH_2—$, $—CH_2CH_2CH_2—$, $—CH(CH_3)CH_2—$, a linear or branched, unsubstituted or substituted $C_4$-$C_{10}$ alkylene group, or a combination thereof; R' is $—CH_2—$, $—CH_2CH_2—$, $—CH_2CH_2CH_2—$, $—CH(CH_3)CH_2—$, a linear or branched, unsubstituted or substituted $C_4$-$C_{10}$ alkyl group, $RNH_2$, $RNHRNH_2$, or $RN(RNH_2)_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

Alternatively, or in addition, the amine is a polyalkyleneamine according to the formula:

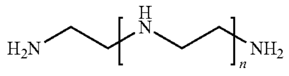

wherein n is an integer between 0-1000, preferably between 1-100, more preferably between 1-8, and still more preferably between 1-6.

More particularly, suitable polyamines include, but are not limited to ethylenediamine, 1,3-diaminopropane, 1,4-diamino-butane, diethylene-triamine, pentaethylenehexamine, tetraethylenepentamine, ethyleneamine E-100 (a blend of tetraethylenepentamine, pentaethylenehexamine, hexaethyleneheptamine and higher molecular weight products), tris(2-aminoethyl)amine, tetraethylenehexamine, triethylenetetramine, diethylenetriamine, hexanethylene diamine, bis(3-aminopropyl)amine, bis(hexanethylene)triamine, tris(2-aminoethyl)amine, triethylenetetramine, N,N'-bis(3-aminopropyl)-1,3-propanediamine, tetraethylenepentamine, pentaethylenehexamine, branched polyethyleneimine, chitosan, nisin, gelatin, 1,3-diamino-guanidine, 1,1-di-methylbiguanide, guanidine, arginine, lysine, ornithine, tris(2-aminoethyl)amine, triethylenetetramine, N,N'-bis(3-aminopropyl)-1,3-propanediamine, tetraethylenepentamine, 1,2-diaminopropane, N,N,N',N'-tetrakis(2-hydroxyethyl) ethylene diamine, N,N,N',N'-tetrakis(2-hydroxypropyl)ethylene diamine, branched polyethyleneimine, 2,4-diamino-6-hydroxypyrimidine and/or 2,4,6-triaminopyrimidine.

Additional polyamines include glycol-initiated polyamines, glycerin-initiated polyamines, sucrose-initiated polyamines, sucrose/glycerin-initiated polyamines, trimethylolpropane-initiated polyamines, divalent and higher polyvalent primary or secondary, aliphatic, aliphatic, cycloaliphatic, or aromatic amines, such as 4-aminobenzylamines, 4,4'-diaminodicyclohexylmethane, phenylene diamines, etc. Polyamines such as diethylenetriamine, triethylenetetramine, diethylene propylamine, N-(2-hydroxyethyl)diethylenetriamine, N,N'-di(2-hydroxyethyl)diethylenetriamine, m-phenylenediamine, methylenedianiline, aminoethyl piperazine, 4,4-diaminodiphenyl sulfone, benzyldimethylamine, dicyandiamide, and 2-methylimidazole, and/or triethylamine.

Further examples of suitable polyamines include, but are not limited to, m-phenylenediamine, p-phenylenediamine, 4,4'-diaminodiphenyl ether, 3,4'-diaminodiphenyl ether, 4,4'-diaminodiphenylsulfone, 3,3'-diaminodiphenylsulfone, 2,2'-ditrifluoromethyl-4,4'-diaminobiphenyl, 9,9-bis(4-aminophenyl)fluorene, 9,9-bis(4-amino-3-methylphenyl)fluorene, bis[4-(4-aminophenoxy)phenyl]sulfone, bis[4-(3-aminophenoxy)phenyl]sulfone, 2,2-bis[4-(4-aminophenoxy) phenyl]propane, 3-(methylamino)propylamine, and 2,2-bis (4-aminophenyl)hexafluoropropane. Other examples include alkyl amines, propyl amine, isobutyl amine, alkyleneoxide amines, ethylene oxide amines, and/or propylene oxide amines.

Suitable aromatic diamines include, for example, diaminodiphenyl-sulfone, a methylenedianiline such as 4,4'-methylenedianiline, a diaminodiphenylether, benzidine, 4,4'-thiodianiline, 4-methoxy-6-m-phenylenediamine, 2,6-diaminopyridine, 2,4-toluenediamine, and dianisidine.

Other possible polyamines include JEFFAMINE® monoamines, diamines, and triamines by Huntsman. These highly versatile products contain primary amino groups attached to the end of a polyether backbone normally based on propylene oxide (PO), ethylene oxide (EO), or a mixture of both oxides. JEFFAMINE® amines include a polyetheramine family consisted of monoamines, diamines and triamines based on the core polyether backbone structure. JEFFAMINE® amines also include high-conversion, and polytetramethylene glycol (PTMEG) based polyetheramines. These JEFFAMINE® amines have an average molecular weight ($M_w$) of from about 130 to about 4,000.

A polyamine used in this disclosure can be a polyamine derivative or modified polyamine, in which one or more of the NH protons, but not all, in the polyamine is substituted by an unsubstituted or substituted group. For example, an alkyl polyamine that contains one or more alkyl group connected to the nitrogen atom can be used to produce the multiple charge cationic polyamine disclosed herein. In these PEI derivatives, only some of primary $NH_2$ or secondary NH protons are replaced by other non-proton groups and the remaining $NH_2$ or NH protons can still react with a Michael acceptor, such as an activated olefin containing a hydrophilic (ionic) group, by an aza-Michael Addition reaction.

One class of the polymeric polyamine includes polyethyleneimine (PEI) and its derivatives. Polyethyleneimine (PEI) or polyaziridine is a polymer with a repeating unit of $CH_2CH_2NH$ and has a general formulation of $NH_2(CH_2CH_2NH)_n—CH_2CH_2NH_2$, wherein n can be from 2 to 105. The repeating monomer in PEI has a molecular weight (Mw) of 43.07 and a nitrogen to carbon ratio of 1:2.

PEI derivatives include ethoxylated/propylated PEIs, polyquats PEI, polyglycerol quats PEI, and other PEI derivatives, salts, or mixtures thereof. The molar mass of the polyethyleneimines, including modified polyethyleneimines can vary from about 800 g/mol to about 2,000,000 g/mol. For Example, SOKALAN® HP20 is an alkoxylated PEI product. In these PEI derivatives, only some of primary $NH_2$ or secondary NH protons are replaced by functional groups and the remaining $NH_2$ or NH protons can still react with a Michael acceptor, e.g., activated olefin or α,β-unsaturated compound containing a hydrophilic (ionic) group.

PEIs and their derivatives can linear, branched, or dendric. Linear polyethyleneimines contain all secondary amines, in contrast to branched PEIs which contain primary, secondary, and tertiary amino groups. Totally branched, dendrimeric forms also exist and contain primary and tertiary amino groups. Drawings for unmodified linear, branched, and dendrimeric PEI are shown below.

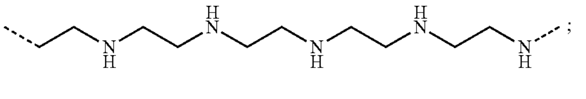

Linear PEI

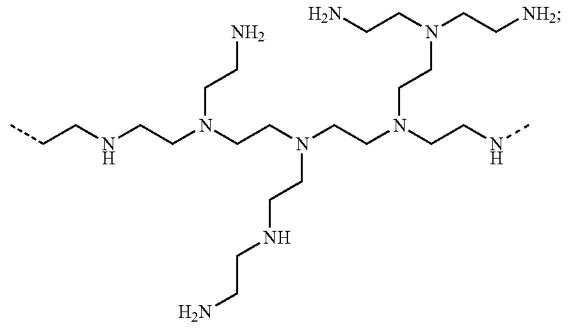

Branched PEI

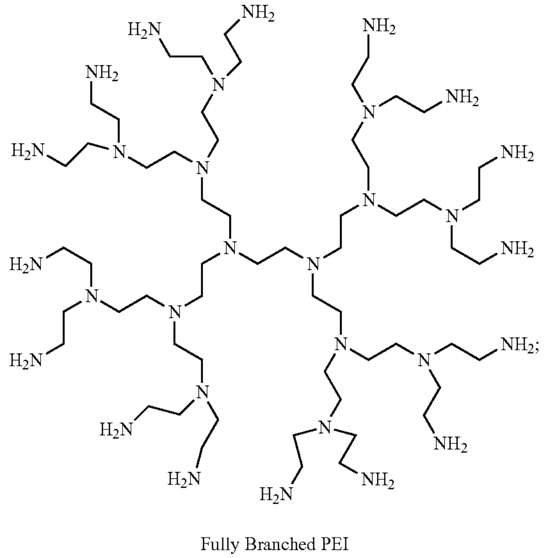

Fully Branched PEI

PEI derivatives are usually obtained by substituting proton(s) on the nitrogen atoms with different group. One such PEI derivative is ethoxylated and propoxylated PEI, wherein the polyethyleneimines are derivatized with ethylene oxide (EO) and/or propylene oxide (PO) side chains. Ethoxylation of PEIs can increase the solubility of PEIs.

PEI is produced on industrial scale. Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. These PEIs have average molecular weights (Mw) of about 800, about 1,300, about 2,000, about 5,000, about 25,000, about 1,300/2,000/5,000, about 25,000, about 750,000, about 750,000, about 1,000,000, and about 2,000,000, respectively.

Two commonly used averages for molecular weight of a polymer are number average molecular weight ($M_n$) and weight average molecular weight ($M_w$). The polydispersity index (D) represents the molecular weight distribution of the polymers. $Mn=(\Sigma n_iM_i)/\Sigma n_i$, $M_w=(\Sigma n_iM_i^2)/\Sigma n_iM_i$, and $D=M_w/M_n$, wherein the index number, i, represents the number of different molecular weights present in the sample and $n_i$ is the total number of moles with the molar mass of $M_i$. For a polymer, $M_n$ and $M_w$ are usually different. For example, a PEI compound can have a $M_n$ of about 10,000 by GPC and $M_w$ of about 25,000 by LS.

Light Scattering (LS) can be used to measure $M_w$ of a polymer sample. Another easy way to measure molecular weight of a sample or product is gel permeation chromatography (GPC). GPC is an analytical technique that separates molecules in polymers by size and provides the molecular weight distribution of a material. GPC is also sometimes known as size exclusion chromatography (SEC). This technique is often used for the analysis of polymers for their both $M_n$ and $M_w$.

These commercially available and example polyethyleneimines are soluble in water and available as anhydrous polyethyleneimines and/or modified polyethyleneimines provided in aqueous solutions or methoxypropanol (as for Lupasol® PO 100).

PEI and its derivatives find many applications usually derived from its polycationic character. Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. In general, PEIs can be purchased as their protonated or unprotonated form with and without water. The commercial PEIs at pH 13 have a charge (cationic) density of about 16-17 meq/g (milliequivalents per gram).

The counterion of each protonated nitrogen center is balanced with an anion of an acid obtained during neutralization. Examples of protonated PEI salts include, but are not limited to, PEI-hydrochloride salt, PEI-sulfuric acid salt, PEI-nitric acid salt, PEI-acetic acid salt PEI fatty acid salt and the like. In fact, any acid can be used to protonate PEIs resulting in the formation of the corresponding PEI salt compound.

Suitable polyethyleneimine useful in the present disclosure may contain a mixture of primary, secondary, and tertiary amine substituents or mixture of different average molecular weights. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary, or tertiary amine substituents.

The polyamine that can be used to make the multiple charged cationic or anionic compounds disclosed herein can have a wide range of its average molecular weight. Different multiple charged cationic or anionic compounds with their characteristic average molecular weights can be produced by selecting different starting small molecule polyamines, polymeric PEIs, or mixture thereof. Controlling the size of polyamines or PEI and extent of modification by the α, β-unsaturated compound and epoxide, one can produce the multiple charged cationic or anionic compounds with a similar average molecular weight and multiple cationic charges or multiple anionic charges. Because of this character, one can produce and use different multiple charged cationic or anionic compounds for a wider range of applications that are using unmodified polyamine or PEIs.

Specifically, the polyamines that can be used to make the modified polyamines disclosed here have an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, about 2,000,000, or any value there between.

In one embodiment, disclosed herein is a multiple charge compound having one of the generic formula of $NA_2$-$[R^{10'}]_n$—$NA_2$, $(RNA)_n$-$RNA_2$, $NA_2$-$(RNA)_n$-$RNA_2$, or $NA_2$-$(RN(R'))_n$-$RNA_2$, wherein $R^{10'}$ is a linear or branched, unsubstituted or substituted $C_4$-$C_{10}$ alkylene group, or a combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or a combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNA_2$, $RNARNA_2$, or $RN(RNA_2)_2$; n can be from 2 to 1,000,000; A is a combination of H,

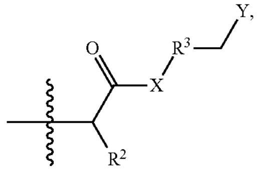, and 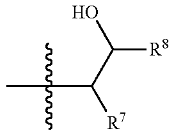;

or a combination of H,

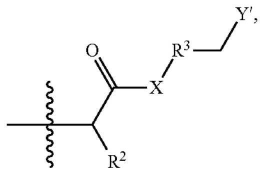, 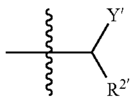, and 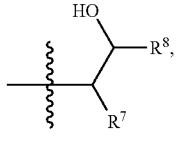, wherein X is NH or O; $R^2$ is H, $CH_3$, or an unsubstituted, linear or branched $C_2$-$C_{10}$ alkyl, alkenyl, or alkynyl group; $R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4; $R^3$ is absent or an unsubstituted, linear or branched $C_1$-$C_{30}$ alkylene group; Y is $-NR_4R_5R_6^{(+)}$; Y' is —COOH, —$SO_3H$, —$PO_3H$, —$OSO_3H$, —$OPO_3H$, or a salt thereof; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is a multiple charged cationic compound having 1, 2, 3, or more

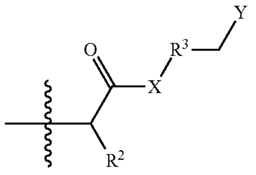

groups and at least one

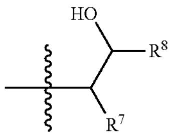

group or a multiple charged anionic compound having 1, 2, 3, or more

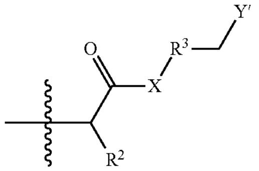

or

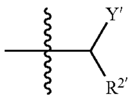

groups, and at least one

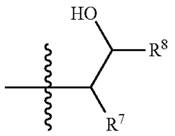

group.

In some embodiments, A is

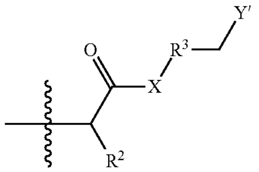

and

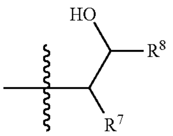

.

In some other embodiments, A is

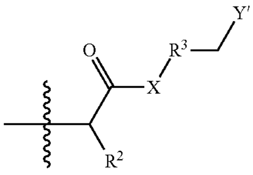

and

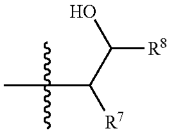

.

In yet some other embodiments, A is

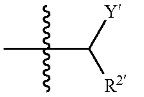

and

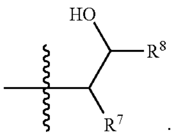

.

In some embodiments, the multiple charge compound is $NA_2$-$[R^{10'}]_n$—$NA_2$. In some other embodiments, the multiple charge compound is $(RNA)_n$-$RNA_2$. In yet some other embodiments, the multiple charge compound is $NA_2$-$(RNA)_n$-$RNA_2$. In some other embodiments, the multiple charge compound is $NA_2$-$(RN(R'))_n$-$RNA_2$. In some embodiments, $R^7$ is H. In some other embodiments, $R^7$ is a $C_1$-$C_4$ alkyl group. In yet some other embodiments, $R^8$ is a $C_{12}$-$C_{20}$ alkyl group.

In another embodiment, disclosed herein is a multiple charged compound derived from a polyamine through its reactions with an activated olefin and an epoxide, wherein the activated olefin has one of the following formulas;

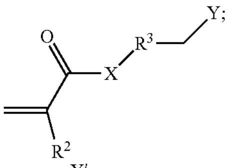

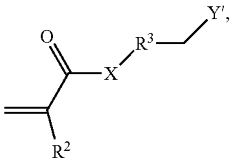

and

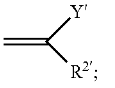

and the epoxide is

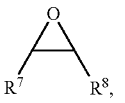

wherein X is NH or O; $R^2$ is H, $CH_3$, or an unsubstituted, linear or branched $C_2$-$C_{10}$ alkyl, alkenyl, or alkynyl group; $R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4; $R^3$ is absent or an unsubstituted, linear or branched $C_1$-$C_{30}$ alkylene group; Y is $-NR_4R_5R_6^{(+)}$; Y' is —COOH, —$SO_3H$, —$PO_3H$, —$OSO_3H$, —$OPO_3H$, or a salt thereof; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the polyamine and activated olefin undergo aza Michael Addition reaction and the polyamine and epoxide undergo ring opening reaction; wherein the compound is a multiple charged cationic compound having 1, 2, 3, or more positive charges from the activated olefin and at least one nonionic group from the epoxide or a multiple charged anionic compound having 1, 2, 3, or more negative charges from the activated olefin and at least one nonionic group from the epoxide.

Regardless of the particular amine, when combined with an epoxide, the molar ratio of the epoxide to the amine is between about 1:20 to about 20:1, inclusive of all ratios therein, for example about 1:12, about 2:12, about 3:12, about 4:12, about 1:13, about 2:13, about 3:13, about 4:13, about 5:13, about 2:14, about 2:14, about 3:14, about 2:16, about 3:16, or about 4:16. In a preferred embodiment, the molar ratio of the amine to epoxide from about 1:1 to about 1:5, more preferably between about 1:2 to about 1:4, and still more preferably between about 1:2 to about 1:3.

Epoxide

The compositions of the application preferably include one or more epoxides. According to the disclosure, the one or more epoxides may be reacted one or more amines to generate an amine epoxide adduct. In an embodiment, the one or more epoxides are derived from an alkylene, in particular a long chain alkylene, and/or an ether. Where the epoxide is derived from an alkylene, the alkylene may be linear or branched, substituted or unsubstituted. In a preferred embodiment, the alkylene is linear. In a further preferred embodiment, the alkylene group has a chain length of $C_8$-$C_{30}$, more preferably a chain length of $C_{12}$-$C_{24}$. In an embodiment, the epoxide may be a monoepoxide or a polyepoxide. In a further embodiment, the epoxide is an epoxide according to the formula:

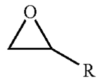

wherein R is an alkyl, alkylene, aliphatic or aryl group. In an embodiment, the alkyl or alkylene group $C_8$-$C_{30}$, more preferably a chain length of $C_{12}$-$C_{24}$.

In some embodiments, the epoxide is an alkyl glycidyl ether, hexylglycidal ether, octylglycidal ether, dodecylglycidal ether, a 1,2-epoxyalkane, 1,2-epoxytertadecane, 1,2-epoxydodecane, or 1,2-epoxyoctane, or mixture thereof. In some other embodiments, the epoxide is an alkyl glycidyl ether or 1,2-epoxyalkane. In yet some other embodiments, the epoxide is hexylglycidal ether, octylglycidal ether, dodecylglycidal ether, or mixture thereof. In some other embodiments, the epoxide is 1,2-epoxytertadecane, 1,2-epoxydodecane, or 1,2-epoxyoctane, or mixture thereof.

More particularly, suitable monofunctional epoxides or monoepoxides include but are not limited to phenyl glycidyl ether, o-cresyl glycidyl ether, p-tert-butylphenyl glycidyl ether, n-butyl glycidyl ether, and other similar glycidyl ethers or esters.

In a preferred embodiment, the epoxide is 1,2-epoxydodecane, 1,2-epoxytetradecane, 1,2-epoxyhexadecane, a $C_{12}$-$C_{14}$ alkyl glycidyl ether, or a combination thereof.

Amine Epoxide Adduct

The compositions of the application preferably include an amine epoxide adduct, preferably a polyamine epoxide adduct, characterized in that an epoxy group is added to the terminal amine group(s) of an amine or polyamine. As described herein, the amine epoxide adduct is prepared by admixing a source of an epoxy group with an amine and allowing the epoxy groups to react with the terminal amino group(s) of the amine or polyamine in order to generate an amine epoxide adduct. Preferably, the polyamine is present in stoichiometric excess relative to the concentration of epoxy groups, so that the epoxy groups are reacted fully on the backbone of the polyamine. In an embodiment, the hydrophobicity and hydrophilicity of the amine epoxide adduct may be adjusted by selecting longer carbon chains and fewer epoxides, respectively.

In an embodiment, the amine epoxide adduct is a compound according to the following formula:

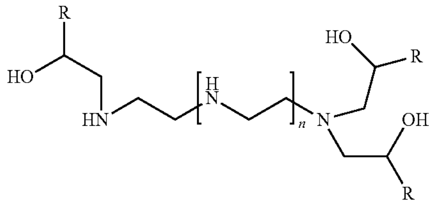

amine-epoxide adduct wherein R is an alkyl or —$(CH_2)$k-O alkyl, k is an integer between 1-10, and wherein n is an integer between 0-1000.

In a preferred embodiment, the amine epoxide adduct is a compound according any one of the following formulae:

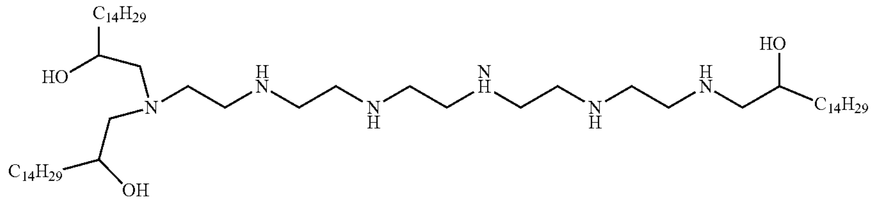

1,2-Epoxyhexadecane-PEHA, having a 1:3 adduct molar ratio;

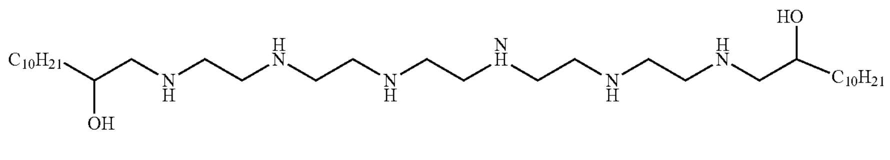

1,2-Epoxydodecane-PEHA, having a 1:2 adduct molar ratio;

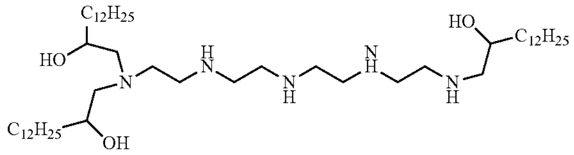

1,2-Epoxytetradecane-TEPA, having a 1:3 adduct molar ratio; and/or

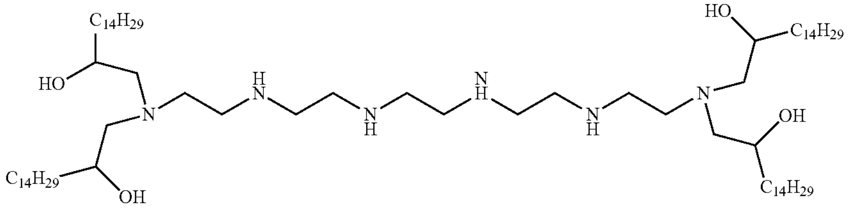

1,2-Epoxyhexadecane-PEHA, having a 1:4 adduct molar ratio.

Methods of Generating an Amine Epoxide Adduct

In an embodiment, an amine epoxide adduct is prepared via a synthesis reaction between a polyamine and an epoxide. In accordance with the synthesis reaction:

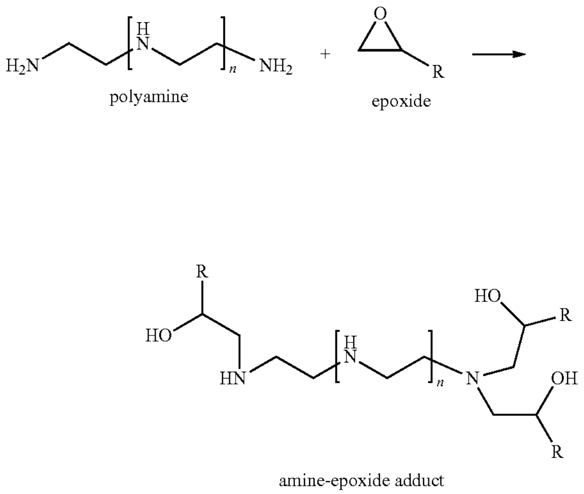

wherein R is an alkyl or a —$(CH_2)$k-O alkyl, wherein k is an integer between 1-10, and n is an integer between 0-1000.

For example, diethylenetriamine may be reacted with epoxydodecane to form a triamine epoxy adduct:

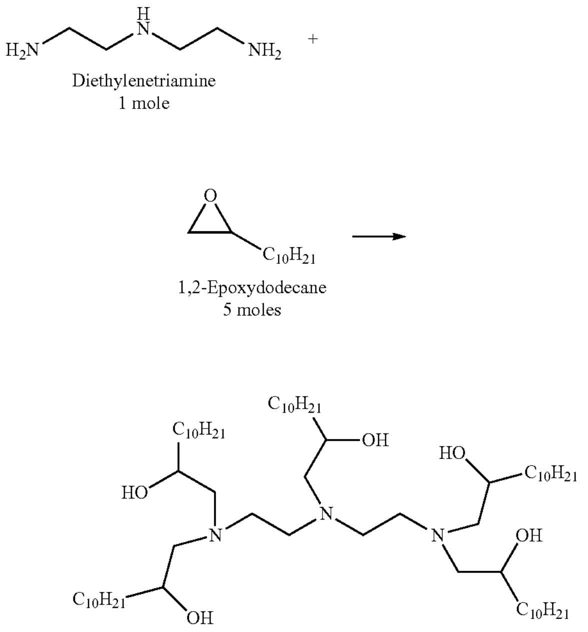

As an additional example, pentaethylenehexamine may be reacted with an epoxydodecane to form a 1:3 amine-epoxide adduct:

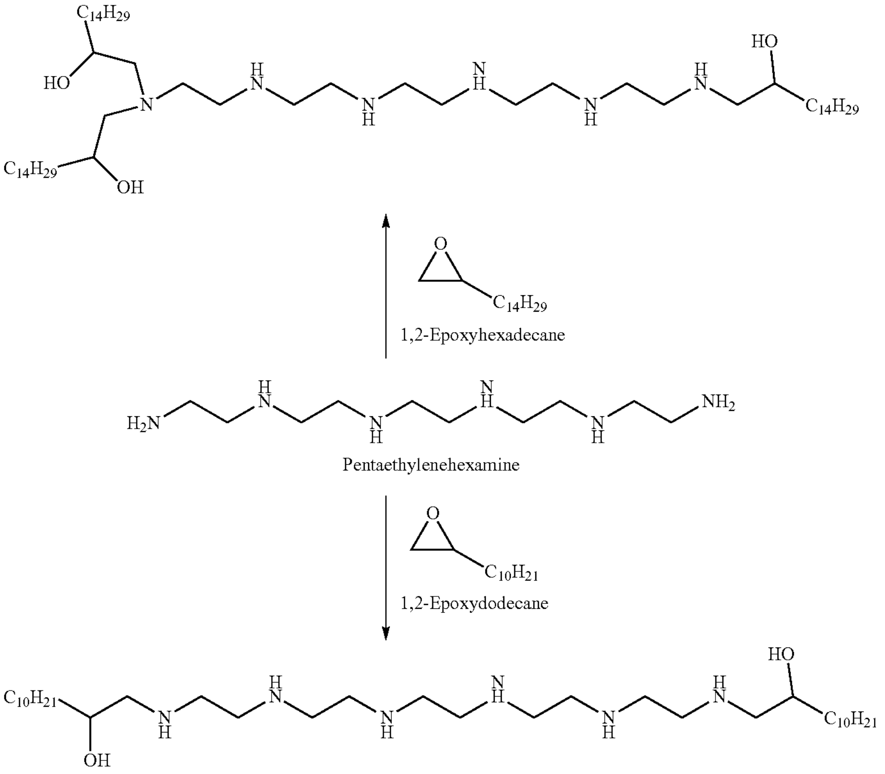

As another example, pentaethylenehexamine may be reacted with an epoxydodecane to form a long chain 1:2 amine-epoxide adduct

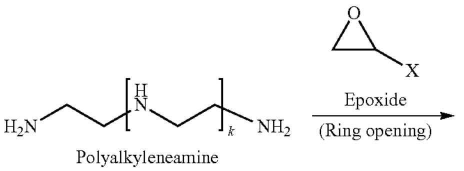

-continued

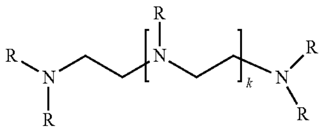

Wherein

-continued

R = H,

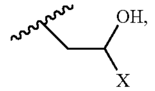

k is an integer of 1-1000, preferably between 1-5, and still more preferably 1, X is $—(CH_2O)_n—R_1$, n is 0-1, and $R_1$ is a linear or branched C8-C30 alkylene group.

The amine-epoxide adduct may be formed using the reagents and ratios outlined in Table 4.

Further preferred amines and epoxides used to generate amine epoxide adducts are shown in Table 4.

TABLE 4

| Amine | Epoxide | Epoxide:Amine Ratio | R Group Length | R Group Types |
|---|---|---|---|---|
| Pentaethylenehexamine | 1,2-epoxydodecane | 1:1 | 12 | Alkyl |
| Tetraethylenepentamine | 1,2-epoxytetradecane | 1:2 | 13 | Ether |
| Diethylenetriamine | 1,2-epoxyhexadecane | 1:3 | 14 | |
| Ethyleneamine E-100 | $C_{12}$-$C_{14}$ alkyl glycidyl ether | 1:4 | 15 | |
| Triethylenetetramine | $C_8$-$C_{10}$ alkyl glycidyl ether | 1:5 | 16 | |
| Tris(2-aminoethyl)amine | 2-ethylhexyl glycidyl ether | | | |
| | Styrene Oxide | | | |

In an embodiment, the method of preparing an amine epoxide adduct comprises the steps of mixing an amine and an epoxide under conditions in which the epoxy group reacts with one or more terminal amino groups and allowing a terminal amino group of the amine to open the epoxy ring of the epoxide, thereby generating an amine epoxide adduct, i.e., an amine with a terminal epoxide adduct.

In an embodiment, where the amine is a polyamine, the method of preparing an amine epoxide adduct comprises the steps of mixing a polyamine and an epoxide under conditions in which the epoxy group reacts with one or more terminal amino groups and allowing a terminal amino group of the polyamine to open the epoxy ring of the epoxide, thereby generating a polyamine with a terminal epoxide adduct as the polyamine epoxide adduct product.

The reaction between the selected amine and epoxide occurs at any suitable temperature where reaction between the reagent can successfully occur. Suitable temperatures include, without limitation between about 90° C. and about 140° C., including about 90° C., about 100° C., about 110° C., about 120° C., about 130° C., and up to about 140° C. The temperature may be increased to increase the rate of reaction, or decreased to slow the rate of reaction, as desired. In an embodiment, the method of preparing an amine epoxide further includes the steps of mixing the amine and epoxide and heating the reagents to a temperature of between about 90° C. to about 140° C., thereby allowing a terminal amino group of the amine to open up the epoxy ring of the epoxide, thereby generating an amine epoxy adduct.

The reaction between the amine and epoxide may occur for the amount of time needed to complete the reaction between the amine and epoxide, as indicated by the consumption of the epoxide. For example, the amine and epoxide may be reacted for a period of between about 1 to about 8 hours, more preferably between about 4 to about 6 hours.

Softening Booster

The compositions can optionally include a softening booster. Softening boosters typically include silicone compounds and polymers, deposition aids, guar derivatives, and other boosters that do not function alone as softeners, but instead boost the efficacy of the amine epoxide adduct softening agent. In a preferred embodiment, the softening booster is a non-cationic booster.

In an embodiment, at least one silicone compound or polymer for added softening benefit in combination with the amine epoxide adduct is included. The silicone compound or polymer boosts the softness of the amine epoxide adduct in addition to providing active softness. Suitable silicones include those having hydrophilic functionality, such as an organosilicone, such as: a polyalkyl silicone, an aminosilicone, a siloxane, a polydimethyl siloxane, an ethoxylated organosilicone, a propoxylated organosilicone, an ethoxylated/propoxylated organosilicone, and mixtures thereof.

In one embodiment, the organosilicone is an aminofunctional silicone or silicone quaternary ammonium compound, hydroxyl modified silicone, or silicone with an incorporated hydrophilic group, and emulsions thereof. Examples of incorporated hydrophilic groups include for example, EO/PO, or PEG modified silicones).

Organosilicones not only provide softness and smoothness to fabrics, but also provide a substantial color appearance benefit to fabrics, especially after multiple laundry washing cycles. Example organosilicones comprise Si—O moieties and may be selected from (a) non-functionalized siloxane polymers, (b) functionalized siloxane polymers, and combinations thereof. The molecular weight of the organosilicone is usually indicated by the reference to the viscosity of the material. In one embodiment, the organosilicones may comprise a viscosity of from about 10 to about 2,000,000 centistokes at 25° C. In another embodiment, suitable organosilicones may have a viscosity of from about 10 to about 800,000 centistokes at 25° C. Suitable organosilicones may be linear, branched or cross-linked. Suitable organosilicones may be in the form of neat liquids, combinations with solvents, or emulsions in water. If aqueous emulsions are used, the preferred silicones are as concentrated as possible to minimize the amount of liquid added to the composition, since large amounts of liquid can complicate the solidification process.

A linear or branched structured silicone polymer can also be used in the solid compositions. The silicone of the present invention can further be a single polymer or a mixture of polymers. In a preferred embodiment the silicone is an amino-functional silicone which can be a linear or branched structured amino-functional silicone polymer and can further be a single polymer or a mixture of polymers, including a mixture of polymers wherein one of the polymers contains no amino functionality, e.g., a polydimethylsiloxane polymer.

Polymers can also be included in the softener booster. Example polymers can include polyalkylenes such as polyethylene, polypropylene, and random and/or block copolymers of polyethylene and polypropylene; polyethylene oxides; EO-PO polymers; polyesters such as polyethylene glycol and biodegradable polymers such as polylactide and polyglycolic acid; polyurethanes; polyamides; polycarbonates; polysulfonates; polysiloxanes; polydienes such as polybutylene; polyacrylates such as polymethylmethacrylate; and additional polymers such as polystyrene and polyacrylonitrile-butadiene-styrene; mixtures of polymers; and copolymerized mixtures of polymers.

Although the compositions are preferably free of cationic softening boosters, if present the compositions may include cationic cellulose and cationically charged polymers, such as polyquaterniums can be used as a softening booster. The term polyquaternium is the International Nomenclature for Cosmetic Ingredients (INCI) designation for various polycationic polymers, including polyquaternium 1-47. For example, polyquaternium-4 is a hydroxyethyl cellulose dimethyl diallyl ammonium chloride copolymer, polyquaternium-10 is a quaternized hydroxyethyl cellulose, and polyquaternium-24 is a hydroxyethyl cellulose or hydroxypropyl cellulose quaternized with glycidyl C12-C22 alkyl dimethyl ammonium chloride. Example polyquaterniums for softening boosting include, for example, Polyquaternium-1, Polyquaternium-5, Polyquaternium-6, Polyquaternium-7, Polyquaternium-8, Polyquaternium-10, Polyquaternium-11, Polyquaternium-14, Polyquaternium-22, Polyquaternium-28, Polyquaternium-30, Polyquaternium-32, and Polyquaternium-33, as named under the International Nomenclature for Cosmetic Ingredients. Various polyquaterniums are commercially available including Flosoft LS407 and Flosoft 247, SOFTCAT SK from Dow Chemicals, CELQUAT $H_{200}$ and CELQUAT L-200 from National Starch and Chemical Company.

An example grouping of softening boosters include the cationic cellulosic polymers cocodimethylammonium hydroxypropyl oxyethyl cellulose, lauryldimethylammonium hydroxypropyl oxyethyl cellulose, stearyldimethylammonium hydroxypropyl oxyethyl cellulose, and stearyldimethylammonium hydroxyethyl cellulose; cellulose 2-hydroxyethyl 2-hydroxy 3-(trimethyl ammonio) propyl ether salt, Polyquaternium-4, Polyquaternium-10, Polyquaternium-24 and Polyquaternium-67 or mixtures thereof.

Additional examples of boosters can include starches that have been chemically modified to provide the starch with a net positive charge in aqueous solution at pH 3. This chemical modification includes, but is not limited to, the addition of amino and/or ammonium group(s) into the starch molecules. Non-limiting examples of these ammonium groups may include substituents such as trimethyl hydroxypropyl ammonium chloride, dimethyl stearyl hydroxypropyl ammonium chloride, or dimethyl dodecyl hydroxypropyl ammonium chloride. The source of starch before chemical modification can be chosen from a variety of sources including tubers, legumes, cereal, and grains. Non-limiting examples of this source of starch may include corn starch, wheat starch, rice starch, waxy corn starch, oat starch, cassava starch, waxy barley, waxy rice starch, glutenous rice starch, sweet rice starch, amioca, potato starch, tapioca starch, oat starch, sago starch, sweet rice, or mixtures thereof. Nonlimiting examples of cationic starches include cationic maize starch, cationic tapioca, cationic potato starch, or mixtures thereof. The cationic starches may comprise amylase, amylopectin, or maltodextrin. The cationic starch may comprise one or more additional modifications. For example, these modifications may include cross-linking, stabilization reactions, phophorylations, hydrolyzations, cross-linking. Stabilization reactions may include alkylation and esterification.

Guar derivatives, including nonionic guars and cationic guars, in addition to a mixture of nonionic and cationic guars, such as Easysoft from Solvay (mixture of hydrophobically modified nonionic guar and cationic guar) can be used as softening boosters. Cationic guar gums are a quaternary ammonium derivative of hydroxypropyl guar such as those sold under the trade name JAGUAR from Rhodia, Inc. Additional examples of cationic polymers include polysaccharide polymers, cationic guar gum derivatives, quaternary nitrogen-containing cellulose ethers, synthetic polymers, copolymers of etherified cellulose, guar, and starch.

Although the compositions are preferably free of cationic softening boosters, if present, example cationic polymers include those produced by polymerization of ethylenically unsaturated monomers using a suitable initiator or catalyst, and also include synthetic polymers made by polymerizing one or more cationic monomers, including N,N-dialkylaminoalkyl acrylate, N,N-dialkylaminoalkyl methacrylate, N,N-dialkylaminoalkyl acrylamide, N,N-dialkylaminoalkyl methacrylamide, quaternized N, N dialkylaminoalkyl acrylate quaternized N,N-dialkylaminoalkyl methacrylate, quaternized N,N-dialkylaminoalkyl acrylamide, quaternized N,N-dialkyl aminoalkyl methacrylamide, methacrylo amidopropyl-pentamethyl-1,3-propylene-2-ol-ammonium dichloride, N,N,N,N',N',N",N"-heptamethyl-N"-3-(1-oxo-2-methyl-2-propenyl)aminopro-pyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally an additional monomer including acrylamide, N,N-dialkyl acrylamide, methacrylamide, N,N-dialkyl methacrylamide, C1-C12 alkyl acrylate, C1-C12 hydroxyalkyl acrylate, polyalkylene glycol acrylate, C1-C12 alkyl methacrylate, C1-C12 hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropyl methane sulfonic acid (AMPS) and their salts. In other embodiments, the cationic polymer backbone does not contain a cationic monomer and instead provides a cationic functionality.

In embodiments employing a softening booster, the softening booster is present at a level in the range of from about 0.1 wt. % to about 20 wt. %, from about 0.5 wt. % to about 20 wt. %, from about 1 wt. % to about 20 wt. %, from about 0.1 wt. % to about 10 wt. %, from about 0.1 wt. % to about 5 wt. %, from about 1 wt. % to about 10 wt. %, or from about 1 wt. % to about 5 wt. % based on the total weight of the solid composition. In some embodiments, non-silicone boosters are present a level in the range of from about 0.01 wt. % to about 10 wt. %, from about 0.1 wt. % to about 10 wt. %, from about 0.1 wt. % to about 5 wt. %, or from about from about 0.1 wt. % to about 2 wt. %.

Surfactants

In some embodiments, the lubricant compositions described herein include one or more surfactants. Surfactants suitable for use include, but are not limited to, nonionic surfactants, anionic surfactants, cationic surfactants, or a combination thereof. In an embodiment, the compositions include one or more nonionic surfactants. In a preferred embodiment, the compositions are free or substantially free of surfactants.

When present, the one or more surfactants may aid in emulsification of the lubricant compositions and may be present in an amount of between about 0.1 wt. % to about 20 wt. % surfactant, from about 0.5 wt. % to about 15 wt. % surfactant, from about 1 wt. % to about 10 wt. % surfactant, and preferably from about 1 wt. % to about 5 wt. % surfactant.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Useful nonionic surfactants include:

(1) Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-functional block copolymers derived from the sequential addition of propylene oxide and ethylene oxide to ethylenediamine. The molecular weight of the propylene oxide hydrotype ranges from about 500 to about 7,000; and the hydrophile, ethylene oxide, is added to constitute from about 10% by weight to about 80% by weight of the molecule.

Some examples of polyoxyethylene-polyoxypropylene block copolymers include those having the following formulae:

$(EO)_x(PO)_y(EO)_x$ $(PO)_y(EO)_x(PO)_y$ $(PO)_y(EO)_x(PO)_y(EO)_x(PO)_y$

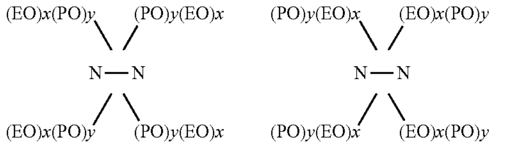

wherein EO represents an ethylene oxide group, PO represents a propylene oxide group, and x and y reflect the average molecular proportion of each alkylene oxide monomer in the overall block copolymer composition. In some embodiments, x is in the range of about 10 to about 130, y is in the range of about 15 to about 70, and x plus y is in the range of about 25 to about 200. It should be understood that each x and y in a molecule can be different.

(2) Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by di-isobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

(3) Condensation products of one mole of a saturated or unsaturated, straight, or branched chain alcohol having from about 6 to about 24 carbon atoms with from about 3 to about 50 moles of ethylene oxide. The alcohol moiety can consist of mixtures of alcohols in the above delineated carbon range, or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

(4) Condensation products of one mole of saturated or unsaturated, straight, or branched chain carboxylic acid having from about 8 to about 18 carbon atoms with from about 6 to about 50 moles of ethylene oxide. The acid moiety can consist of mixtures of acids in the above defined carbon atoms range, or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

(5) In addition to ethoxylated carboxylic acids, commonly called polyethylene glycol esters, other alkanoic acid esters formed by reaction with glycerides, glycerin, and polyhydric (saccharide or sorbitan/sorbitol) alcohols have utility for specialized embodiments, particularly indirect food additive applications. All of these ester moieties have one or more reactive hydrogen sites on their molecule which can undergo further acylation or ethylene oxide (alkoxide) addition to control the hydrophilicity of these substances.

(6) Further suitable nonionic surfactants include reverse Pluronics™ which are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

(7) The alkyl phenoxy polyethoxy alkanols of U.S. Pat. No. 2,903,486 issued Sep. 8, 1959, to Brown et al. and represented by the formula

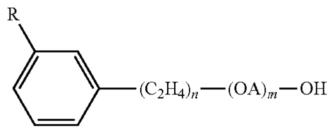

in which R is an alkyl group of 8 to 9 carbon atoms, A is an alkylene chain of 3 to 4 carbon atoms, n is an integer of 7 to 16, and m is an integer of 1 to 10.

(8) The polyalkylene glycol condensates of U.S. Pat. No. 3,048,548 issued Aug. 7, 1962, to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

(9) The nonionic surfactants disclosed in U.S. Pat. No. 3,382,178 issued May 7, 1968, to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

(10) The conjugated polyoxyalkylene compounds described in U.S. Pat. No. 2,677,700, issued May 4, 1954, to Jackson et al. corresponding to the formula $Y(C_3H_6O)_n (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

(11) The conjugated polyoxyalkylene compounds described in U.S. Pat. No. 2,674,619, issued Apr. 6, 1954 to Lundsted et al. having the formula $Y[(C_3H_6O_n (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerin, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

(12) Additional conjugated polyoxyalkylene surface-active agents which are suitable correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

(13) Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxy hydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction, such as a glycityl moiety.

(14) The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

(15) The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

(16) Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

(17) Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)xH$, where x is in the range of from 1 to 3.

(18) A useful class of nonionic surfactants include the class defined as alkoxylated amines or, most particularly, alcohol alkoxylated/aminated/alkoxylated surfactants. These nonionic surfactants may be at least in part represented by the general formulae: $R^{20}$—$(PO)_SN$-$(EO)_tH$, $R^{20}$—$(PO)_SN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—(PO)v-$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Suitable nonionic surfactants include alcohol alkoxylates, EO/PO block copolymers, alkylphenol alkoxylates, and the like.

In addition to the list of nonionic surfactants described herein, the treatise *Nonionic Surfactants*, edited by Schick, M. J., Vol. 1 of the Surfactant Science Series, Marcel Dekker, Inc., New York, 1983 is a useful reference on the wide variety of suitable nonionic compounds. A typical listing of nonionic classes, and species of these surfactants, is given in U.S. Pat. No. 3,929,678 issued to Laughlin and Heuring on Dec. 30, 1975.

The lubricant compositions may optionally include one or more semi-polar nonionic surfactants. The semi-polar nonionic surfactants include the amine oxides, phosphine oxides, sulfoxides and their alkoxylated derivatives.

Amine oxides are tertiary amine oxides corresponding to the general formula:

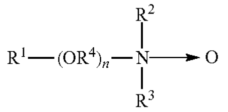

wherein the arrow is a conventional representation of a semi-polar bond; and $R^1$, $R^2$, and $R^3$ may be aliphatic, aromatic, heterocyclic, alicyclic, or combinations thereof. In some embodiments, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g., through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl)amine oxides, specific examples of which are dodecyl dimethylamine oxide, tridecyl dimethylamine oxide, tetradecyl dimethyl amine oxide, dimethyl(pentadecyl)amine oxide, hexadecyl dimethyl amine oxide, heptadecyl dimethyl amine oxide, octadecyl dimethyl amine oxide, dodecyl dipropyl amine oxide, tetra decyl dipropyl amine oxide, hexadecyl dipropyl amine oxide, tetradecyl dibutyl amine oxide, octadecyl dibutyl amine oxide, bis(2-hydroxyethyl)dodecyl amine oxide, bis(2-hydroxyethyl)-3-dodecoxy-1-hydroxypropylamine oxide, dimethyl-(2-hydroxydodecyl)amine oxide, 3,6,9-trioctadecyl dimethyl amine oxide and 3-dodecoxy-2-hydroxypropyldi-(2-hydroxyethyl)amine oxide.

Useful semi-polar nonionic surfactants also include the water-soluble phosphine oxides having the following structure:

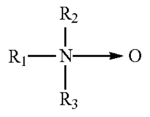

wherein the arrow is a conventional representation of a semi-polar bond; and $R^1$ is an alkyl, alkenyl or hydroxyalkyl moiety ranging from 10 to about 24 carbon atoms in chain length; and $R^2$ and $R^3$ are each alkyl moieties separately selected from alkyl or hydroxyalkyl groups containing 1 to 3 carbon atoms.

Examples of useful phosphine oxides include octyldimethylphosphine oxide, dimethyl tetradecyl phosphine oxide, methyl ethyl tetradecyl phosphonium oxide, dimethyl hexadecyl phosphine oxide, diethyl-2-hydroxyoctyldecylphosphine oxide, bis(2-hydroxyethyl) dodecyl phosphine oxide, and bis(hydroxymethyl)tetradecyl phosphine oxide.

Semi-polar nonionic surfactants useful herein also include the water-soluble sulfoxide compounds which have the structure:

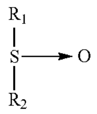

wherein the arrow is a conventional representation of a semi-polar bond; and $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl)amine oxides, specific examples of which are octyl dimethylamine oxide, nonyl dimethylamine oxide, decyl dimethylamine oxide, undecyl dimethylamine oxide, dodecyl dimethylamine oxide, iso-dodecyl dimethyl amine oxide, tridecyl dimethylamine oxide, tetradecyl dimethylamine oxide, pentadecyl dimethyl amine oxide, hexadecyl dimethylamine oxide, heptadecyl dimethylamine oxide, octadecyl dimethylamine oxide, dodecyl dipropyl amine oxide, tetradecyl dipropyl amine oxide, hexadecyl dipropyl amine oxide, tetradecyl dibutyl amine oxide, octadecyl dibutyl amine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Suitable nonionic surfactants further include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like.

Anionic Surfactants

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkyl polysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g., alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages, and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acyl amino acids (and salts), such as acyl glutamate, acyl peptides, sarcosinates (e.g., N-acyl sarcosinates), taurates (e.g., N-acyl taurates and fatty acid amides of methyl tauride), and the like.

Suitable anionic surfactants include alkyl or alkyl aryl ethoxy carboxylates of the following formula:

$$R—O—(CH_2CH_2O)_nCH_2)_m—CO_2X \quad (3)$$

in which R is a $C_8$ to $C_{22}$ alkyl group or

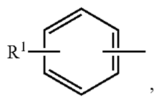

, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

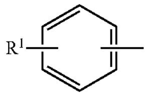

and $R^1$ is a $C_6$-$C_{12}$ alkyl group. In still yet other embodiments, $R^1$ is a $C_9$ alkyl group, n is 10 and m is 1.

Such alkyl and alkyl aryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkyl aryl polyethoxy (10) carboxylic acid (Witco Chemical). Carboxylates are also available from Clariant, e.g., the product Sandopan® DTC, a $C_{13}$ alkyl polyethoxy (7) carboxylic acid.

Processing Aid

Processing aids can provide advantageous features to the solid compositions. In an embodiment, the processing aid for solidification includes one or more non-deliquescent materials. Beneficially, including a non-deliquescent material provides a non-hygroscopic material such that when the solid composition is exposed to humidity (such as during the dispensing of a solid composition) the composition does not absorb water or does not absorb sufficient water to become liquid. This is important due to the dispensing challenges, namely humid environments that the solid compositions are exposed to.

The solid compositions may include one or more processing aids that are medium to long chain fatty carboxylic acids. Example fatty acids, such as a free fatty acids can be employed and the term "fatty acid" is used herein in the broadest sense to include unprotonated or protonated forms of a fatty acid. One skilled in the art will readily appreciate that the pH of an aqueous composition will largely determine whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise). The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms. The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated disubstituted cyclopentyl or cyclohexyl derivatives of polyunsaturated acids) fatty acids. Mixtures of fatty acids from different fat sources can be used.

Suitable carboxylic acids may be saturated or unsaturated but are preferably saturated carboxylic acids. These carboxylic acids have at least 6 carbon atoms, or from about 6 to about 22 carbon atoms on the alkyl or alkenyl chain and are in either straight chain or branched chain configuration, preferable carboxylic acids are in straight chain configuration having at least 6 carbon atoms, preferably from about 12 to about 22 carbon atoms. Non-limiting examples of useful carboxylic acids include lauric acid (C12), stearic acid (C18), palmitic acid (C16) or behenic acid (C22). Additional examples include long chain fatty acids or its salt, such as stearic acid, palmitic acid, coco fatty acid, stearic monoethanolamide, coco-monoethanolamide, and the like. Without being limited to a particular mechanism of action or theory of the inveiton, the C6-C22 alkyl chains of the carboxylic acid stabilizing agents are preferred as they readily form hard, low-melting urea occlusion complexes.

Additional processing aids can include LMEA (lauric monoethanolamide), SMEA (stearic monoethanolamide), etc. Various hydrophobic species that are solid at room temperature are suitable for use as stabilizing agents, including but not limited to: palmitic acid, coco fatty acid, lauric monoethanolamide, stearic monoethanolamide, coco-monoethanolamide, fatty acids described above.

According to the various embodiments described herien, preferred processing aids have a solubility between 4 ppm and 10,000 ppm in water at 45° C. and are compatible with quaternary ammonium compounds. Further preferred prcoessing aids have a melting point above 60° C., preferably between 60° C. and 100° C.

When included in the composition the processing aid is present at a level of from about 0.1% to about 5.0% by weight based on the total weight of the composition, preferably from about 0.5% to about 4.5%, and most preferably from about 1% to about 4% by weight based on the total weight of the composition.

Solvent

The compositions may further comprise one or more solvents. Any suitable solvent may be used in the compositions, including organic or inorganic solvents. The solvent may be a glycol-based solvent, such as 2,2,4-trimethyl-1,3-pentanediol, 1,2-hexanediol, 2-ethyl-1,3-hexanediol, cocamide 6EO, canola fatty acid, 2,4-cyclohexyl dimethanol, $C_{9-11}EO_8$, benzyl benzoate, or a combination thereof. Alternatively, or in addition to a glycol-based solvent, the compositions may include an alcohol-based solvent, such as benzyl alcohol, isopropanol, ethanol, or a combination thereof. In an embodiment, the solvent is water. Further solvents are described in U.S. Pat. No. 6,521,589, which is herein incorporated by reference in its entirety.

When included in the composition the solvent is present at a level of from about 0.1% to about 90% by weight based on the total weight of the composition, preferably from about 10% to about 50%, and most preferably from about 30% to about 40% by weight based on the total weight of the composition.

Solidification Aid

The compositions may further comprise one or more solidification aids/agents or hardening agents. A variety of solidification agents may be used. In an embodiment, the solidification aid is a sulfate or sulfonate, such as sodium xylene sulfonate, sodium toluene sulfonate, sodium cumene sulfonate, potassium toluene sulfonate, ammonium xylene, sodium butylnaphthalene sulfonate, or a combination thereof. Further sulfates include but are not limited to sodium ethyl hexyl sulfate, sodium linear octyl sulfate, sodium lauryl sulfate, and sodium sulfate. In an embodiment, the compositions include urea as a solidification aid. The urea may be in the form of prilled beads or powder. Urea hardening agents are disclosed, including ratios of urea to water or other components in an acidic composition, for example in U.S. Pat. Nos. 5,698,513 and 7,279,455, which are herein incorporated by reference in their entirety. Additional hardening agents include stearic monoethanolamide, lauric diethanolamide, alkylamide, polyethylene glycol, and solid EO/PO block copolymers.

When included in the composition the solidification aid is present at a level of from about 1% to about 25% by weight based on the total weight of the composition, preferably from about 0.5% to about 15%, and most preferably from about 10% to about 25% by weight based on the total weight of the composition.

Alkalinity Source

The disclosed methods of preparation or compositions may optionally include using an effective amount of an alkalinity source or base as a catalyst or ingredient. The alkalinity source or base in turn comprises one or more alkaline compounds. The alkalinity source can be added to the reaction mixture in the form of solid, liquid, or solution thereof.

In general, an effective amount of the alkalinity source should be considered as an amount that provides a reaction mixture having a pH of at least about 8. When the solution has a pH of between about 8 and about 10, it can be considered mildly alkaline, and when the pH is greater than about 12, the solution can be considered caustic.

The alkalinity source can include an alkali metal carbonate, an alkali metal hydroxide, alkaline metal silicate, alkaline metal metasilicate, or a mixture thereof. Suitable metal carbonates that can be used include, for example, sodium or potassium carbonate, bicarbonate, sesquicarbonate, or a mixture thereof. Suitable alkali metal hydroxides that can be used include, for example, sodium, lithium, or potassium hydroxide. Examples of useful alkaline metal silicates include sodium or potassium silicate (with $M_2O$:$SiO_2$ ratio of 2.4 to 5:1, M representing an alkali metal) or metasilicate. A metasilicate can be made by mixing a hydroxide and silicate. The alkalinity source may also include a metal borate such as sodium or potassium borate, and the like.

The alkalinity source may also include ethanolamine, urea sulfate, amines, amine salts, and quaternary ammonium. The simplest cationic amines, amine salts and quaternary ammonium compounds can be schematically drawn thus:

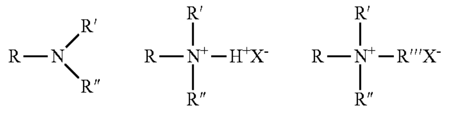

in which, R represents a long alkyl chain, R', R'', and R''' may be either long alkyl chains or smaller alkyl or aryl groups or hydrogen and X represents an anion.

In some embodiments, the methods of preparation and/or compositions are free of the alkalinity source because the reactants contain a primary amine or primary amine group to catalyze the reaction. In some embodiments, the compositions disclosed herein are free of the alkalinity source.

Additional Functional Ingredients

The components of the compositions can further be combined with various functional components suitable for use in softening applications and/or processing and forming the compositions. In some embodiments, the amine epoxide adduct, softening booster, processing aid, surfactants, and/or solvent make up a large amount, or even substantially all of the total weight of the composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution or suspension, provides a beneficial property in softening and/or maintaining stability and suitable processing and/or dispensing of the composition. Some particular examples of functional materials are discussed in more detail below, although the particular materials discussed are given by way of example only, and that a broad variety of other functional ingredients may be used.

In other embodiments, the compositions may include salts, alkalinity sources, defoaming agents, anti-redeposition agents, solubility modifiers, dispersants, stabilizing agents, sequestrants and/or chelating agents, surfactants, anti-wrinkling agents, optical brighteners, dyes, rheology modifiers or thickeners, hydrotropes or couplers, buffers, solvents, enzymes, soil-release agents, dye scavengers, starch/crisping agent, antimicrobial agents, fungicides, antioxidants or other skin care components, sanitizers and components for residual protection, and the like. The compositions may also include any softener compatible fragrance/perfume. Suitable perfumes are disclosed in U.S. Pat. No. 5,500,138, which is herein incorporated herein by reference in its entirety.

When included in the composition the one or more additional functional ingredients are present at a level of from about 0% to about 70% by weight based on the total weight of the composition, preferably from about 1% to about 60%, and most preferably from about 5% to about 60% by weight based on the total weight of the composition.

Methods of Making a Composition

The water compositions may be provided as a solid composition or a liquid concentrate which is optionally further diluted to form a ready-to-use composition (or "use solution"). By the term "solid," it is meant that the hardened composition will not flow and will substantially retain its shape under moderate stress or pressure or mere gravity. Suitable solid compositions include, but are not limited to, granular and pelletized solid compositions, flakes, powders, granule, pellet, tablet, lozenge, puck, briquette, brick, unit dose, solid block composition, cast solid block compositions, extruded solid block composition, pressed solid compositions, or the like.

In general, the various compositions are made by generating the amine epoxide as described herein, and then combining the amine epoxide adduct with the other components of the composition, e.g., a softening booster, processing aid, surfactant, solvent, and any additional functional ingredients as desired. In some embodiments, the combination of the components occurs by blending or mixing the dry and/or wet components in appropriate ratios and relative weight percentages. As referred to herein, blending or mixing can include suitable mechanism, including for example, a ribbon blender or other form of manual and/or mechanical mixing.

In an embodiment, a method of forming a solid composition comprises the steps of admixing at least the amine epoxide adduct with a solidification aid and allowing the mixture to harden. The mixture may set into a solid by itself over a period of time and/or the mixture may be solidified through pressing, casting, or extruding the mixture.

In a pressed solid process, a flowable solid, such as granular solids or other particle solids are combined under pressure to form the solid composition. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 3000 psi, about 1 to about 2000 psi, about 1 to about 1000 psi, about 1 to about 500 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term “psi” or “pounds per square inch” refers to the actual pressure applied to the flowable solid being pressed and does not refer to the gauge or hydraulic pressure measured at a point in the apparatus doing the pressing.

The methods can optionally include a curing step to produce the solid compositions. As referred to herein, an uncured composition including the flowable solid is compressed to provide sufficient surface contact between particles making up the flowable solid that the uncured composition will solidify into a stable solid composition. A sufficient quantity of particles (e.g., granules) in contact with one another provides binding of particles to one another effective for making a stable solid composition. Inclusion of a curing step may include allowing the pressed solid to solidify for a period of time, such as a few hours, or about 1 day (or longer). In additional embodiments, the methods could include vibrating the flowable solid in the form or mold, such as the methods disclosed in U.S. Pat. No. 8,889,048, which is herein incorporated by reference in its entirety.

In an embodiment, the method of making a liquid concentration composition comprises admixing at least the amine epoxide adduct and a solvent to form a liquid composition. The liquid concentrate compositions may then be diluted to form use compositions for the various applications of use thereof. In general, a concentrate refers to a composition that is intended to be diluted with water to provide a use solution that contacts a surface and/or product in need of treatment to provide the desired rinsing, cleaning, sanitizing or the like. The liquid concentrate compositions diluted for a use composition that contacts the textiles, papers, or surfaces can be referred to as a concentrate or a use composition (or use solution) depending upon the formulation employed in the methods according to the invention. It should be understood that the concentration of the active components for the desired softening will vary depending on whether the composition is provided as a concentrate or as a use solution.

The water that is used to dilute the concentrate to form the use composition can be referred to as water of dilution or a diluent and can vary from one location to another. The typical dilution factor is between about 1 and about 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:100 and about 1:1,000 concentrate to water, or about 1:100 and about 1:500 concentrate to water. Without limiting the scope of invention, the numeric ranges are inclusive of the numbers defining the range and include each integer within the defined range.

Methods of Using a Fabric Composition

The compositions are suitable for use as laundry or fabric compositions for consumer and industrial laundering applications. Accordingly, single use and multi-use compositions can be provided according to the embodiments described here.

Beneficially, the treated linens have premium softness in addition to whiteness, brightness, and malodor removal. By softness, it is meant that the quality perceived by users through their tactile sense to be soft. Such tactile perceivable softness may be characterized by, but not limited to resilience, flexibility, fluffiness, slipperiness, and smoothness and subjective descriptions such as “feeling like silk or flannel.” In an embodiment, the softness resulting from the use of the composition is at least equivalent to the softness preference exhibited by commercially available liquid fabric softener compositions.

The compositions also provide desired softness without causing any significant loss of water absorption or wicking to the treated linen. As one of the primary functions of certain linens, such as towels is to absorb water, it is undesirable for fabric softener actives to make the surface hydrophobic and decrease the amount of water that can be absorbed. The compositions do not reduce water absorption—which can be measured by the distance water can wick up a treated linen in a fixed period of time (as outlined in the Examples).

Additionally, the compositions provide softness without causing any significant yellowing or discoloration to the treated linen. The yellowing gives the linens an unclean or unsavory appearance at best. As such, the use of quaternary ammonium fabric conditioners which causes yellowing may provide a nice feel but shorten the overall life of a linen because the linen must be discarded before its otherwise useful life is exhausted. In the case of colored linens, yellowing is less obvious but the quaternary ammonium compounds cause a dulling of the colors over time.

It is easily appreciated that it is desirable according to the compositions and methods disclosed herein to provide a softening agent that does not cause significant yellowing or dulling of fabrics that are repeatedly washed and dried. Moreover, it is generally desirable for white laundry that is dried to remain white even after multiple drying cycles. That is, it is desirable that the fabric not yellow or dull after repeated cycles of drying. Yellowing or discoloration can be measured either directly visually or using a spectrophotometer, typically through “L,” “a,” and “b” values of the color scale. The color change is then reported as delta E (as outlined in the Examples) between treated and new linen. Typically, a value of delta E>1 is considered perceptible to the human eye and indicates discoloration, such as yellowing.

Generally, for the softening or lubricating process, the composition is dispensed by contacting a with a sufficient amount of water to dissolve at least a portion of the composition, thereby forming a dissolved portion of the composition that can then be added to the rinse cycle of the laundry process. The water temperature for dispensing should be from about 40° C. to about 60° C., preferably from about 45° C. to about 55° C. The formulations of the present invention preferably dispense at greater than 10 grams/minute, more preferably greater than 15 grams/minute, and most preferably greater than 20 grams/minute.

The diluted liquid compositions formed from the compositions disclosed herein are preferably used in the rinse cycle of the conventional automatic laundry operations. Generally, rinse water has a temperature from about 5° C. to about 60° C.

Fabrics or fibers are contacted with an amount of the composition that is effective to achieve the desired level of softness. The amount used is based upon the judgment of the user, depending on concentration of the softening material, fiber or fabric type, degree of softness desired, and the like. The amount of softener dispensed is typically characterized as the ratio of the amount of softening quaternary ammonium compound active to the amount of linen. This ratio is preferably in the range of from 0.01% quaternary ammonium compound active to linen to as high as 0.25%, more preferably in the range of 0.025% to 0.20%.

The amount of water used to deliver this amount of composition can be any amount that can conveniently dissolve the desired dose in the required amount of time to deliver the composition to the rinse cycle of the machine. For example, using water from 45° C. to 55° C. a 100 g dose of composition is typically dispensed in from 1 to 4 minutes using from 2 to 10 liters of water.

Methods of Softening Tissue Paper

Softness of tissue paper is an important parameter for tissue manufacturers, which should be maximized to improve the consumer perception of the product. While other parameters of tissue paper (e.g., tensile strength, bulk, etc.) can be easily measured, the evaluation of softness is difficult because it is a complex human perception, influenced by physical and physiological senses. Softness is frequently defined as a combination of bulk softness, being understood as the gentle crumpling, or folding of the tissue, and surface softness, which is assessed by the gently rubbing the fingertips and palms over the tissue surface. Paper softness can be improved through different approaches such as, the use of a better-quality fiber or through mechanical approaches during the tissue making process. However, mechanical approaches are limited by productivity and economic reasons. Another approach to tackle these limitations and improve the softness of the paper, is the addition of a softening compound to the fiber suspension.

Softening compounds can function to improve bulk softness by sterically hindering the fiber-to-fiber bonding, which, on the one hand, leads to a softer paper, while on the other hand, this bond interference lowers the sheet strength. Many traditional softening products comprise cationic surfactants, primarily quaternary ammonium compounds. However, quaternary ammonium compounds have undesirable side effects, such as, toxicity to aquatic organisms and can cause skin and eyes irritation. Therefore, there is the need to develop additional chemistries having less harmful effects to the environment and health.

Tissue paper is softened through any suitable method of applying, saturating, or embedding the compositions of the application on or in tissue paper. The compositions may be applied to individual constituents of tissue paper before manufacturing of the tissue paper (e.g., fibers, such as cellulose fibers) and/or applied to the final tissue product. Examples of suitable methods of applying, saturating, and embedding the compositions include soaking, spraying, debonding, and encapsulation, among others.

As an example, when the compositions are applied via spray nozzle, rather than soaking cellulose or other fibers, the final tissue product is sprayed with the compositions, causing a modification of the softness of the exterior surface. The internal structural integrity of the tissue product remains, but the surface of the tissue demonstrates improved softness. As another example, when the compositions are applied via de-bonding, cellulose fibers are prevented from overlapping or cross-linking, and are instead soaked or otherwise saturated with the compositions. When overlapping or other bonding is subsequently allowed, the tissue retains softness but obtains rigidity through by virtue of these bonds. As a still further example, the compositions may be encapsulated into microcapsules that are then made to adhere to the structure of the tissue product or cellulose fibers. Further discussion of both encapsulation and soaking methods is found in EP 2826917, which is herein incorporated by reference in its entirety.

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

Methods of Lubricating a Surface or Water Source

In some embodiments, the compositions are utilized as a lubricant or friction reducer in water or other water-based fluids used in hydraulic fracturing treatments for subterranean well formations in order to improve permeability of the desired gas and/or oil being recovered from the fluid-conductive cracks or pathways created through the fracking process. The friction reducers allow the water to be pumped into the formations more quickly.

The present methods can be used to treat any suitable water source. For example, a water source in need of treatment can be fresh water, pond water, sea water, produced water, paper manufacturing water, tower water or a combination thereof. In some embodiments, the tower water is cooling water. In some embodiments, the present methods can be used to treat a water source used in oil or gas drilling operation. For example, the present methods can be used to treat a water source used in an operation of induced hydraulic fracturing (hydrofracturing or fracking), a water source in a subterranean environment, e.g., a subterranean environment that comprises a well in a gas and/or oil operation, or a produced water source. The compositions may also be used to lubricate a surface, functioning a lubricant for a bearing, natural gas engine, compounded gear lubricant, oven conveyor lubricant, oil paper machine lubricant, rock drill lubricant, spindle lubricant, steam cylinder lubricant, machinery lubricant, gear lubricant, marine lubricant, or the like.

In an embodiment, the methods of lubricating a surface or water source comprise contacting a target comprising water source or surface with an effective amount of the compositions to form a treated target composition, wherein the treated target composition comprises between about 1 ppm to about 10,000 ppm of the compositions described herein, and the contacting lasts for a sufficient time to lubricate or reduce friction in the water source or surface.

In an embodiment, the compositions may be used in conjunction with one or more additional polymer additives widely used as friction reducers to enhance or modify the characteristics of the aqueous fluids used in well drilling, recovery, and production applications. Examples of commonly used friction reducers include polyacrylamide polymers and copolymers. In an embodiment, additional suitable friction reducers may include acrylamide-derived polymers and copolymers, such as polyacrylamide (sometime abbreviated as PAM), acrylamide-acrylate (acrylic acid) copolymers, acrylic acid-methacrylamide copolymers, partially hydrolyzed polyacrylamide copolymers (PHPA), partially hydrolyzed polymethacrylamide, acrylamide-methyl-propane sulfonate copolymers (AMPS) and the like. Various derivatives of such polymers and copolymers, e.g., quaternary amine salts, hydrolyzed versions, and the like, should be understood to be included with the polymers and copolymers described herein.

EXAMPLES

Preferred embodiments are further defined in the following non-limiting Examples. It should be understood that these Examples, while indicating certain embodiments, are given by way of illustration only. From the above discussion and these Examples, it is possible to ascertain key embodiments of the disclosure such that, without departing from the spirit and scope thereof, it is possible to make various changes and modifications to the embodiments to adapt it to preferred conditions and usages. Thus, various modifications of the embodiments, in addition to those shown and described herein, will be apparent from the foregoing description. Such modifications are also intended to fall within the scope of the appended claims.

Example 1

A series of amine epoxide adducts were generated by combining one or more amines with one or more epoxides as described in the Tables below.

1. Example Formula 1

A first amine epoxide adduct was prepared by adding pentaethylenehexamine (PEHA) together with a $C_{12}$-$C_{14}$ alkyl glycidyl ether (average molecular weight 275-300 g/mol) into a flask equipped with a $N_2$ blanket, condenser, and thermocouple in the quantities and ratios shown in Table 5. The temperature controller was set to 120° C. The amine and epoxide were reacted for six hours. After six hours, the resulting amine epoxide solution was cooled.

TABLE 5

| 8511-94 | | | | | | |
|---|---|---|---|---|---|---|
| Reagent | % Actives (Concentration) | MW (g/mol) | Mass (g) | Adjusted Mass (g) | n moles | Molar Ratio |
| PEHA Amine | 99% | 232.37 | 40 | 39.60 | 0.17 | 1 |
| GE-8 | 99% | 287.50 | 150 | 148.50 | 0.51 | 3 |

2. Example Formulas 2-22

Following the procedure described in Example 1.1, various amine epoxide adducts (Table 6) were generated using different starting polyalkyleneamine and epoxide reactants, at varying molar ratios. The epoxide to amine mole ratio (1:1 to 5:1) was varied. Diethylenetriamine, tetraethylenepentamine, pentaethylenehexamine and Ethyleneamine E-100 were used as amine reactants, and 1,2-epoxydodecane, 1,2-epoxytetradecane, 1,2-epoxyhexadecane, C-12-C14 alkyl glycidyl ether, were used as epoxide reactants.

TABLE 6

| Examples Formulas 2-22 | | | |
|---|---|---|---|
| Formula | Amine | Epoxide | Epoxide:Amine Ratio |
| Ex. F. 1 | Pentaethylenehexamine | C12-C14 alkyl glycidyl ether | 3 |
| Ex. F. 2 | Pentaethylenehexamine | C12-C14 alkyl glycidyl ether | 4 |
| Ex. F. 3 | Ethyleneamine E-100 | C12-C14 alkyl glycidyl ether | 2 |
| Ex. F. 4 | Ethyleneamine E-100 | C12-C14 alkyl glycidyl ether | 3 |
| Ex. F. 5 | Ethyleneamine E-100 | C12-C14 alkyl glycidyl ether | 3 |
| Ex. F. 6 | Ethyleneamine E-100 | C12-C14 alkyl glycidyl ether | 4 |
| Ex. F. 7 | Pentaethylenehexamine | 1,2-epoxydodecane | 3 |
| Ex. F. 8 | Pentaethylenehexamine | 1,2-epoxydodecane | 4 |
| Ex. F. 9 | Tetraethylenepentamine | 1,2-Epoxytetradecane | 2 |
| Ex. F. 10 | Tetraethylenepentamine | 1,2-Epoxytetradecane | 3 |
| Ex. F. 11 | Pentaethylenehexamine | 1,2-epoxytetradecane | 2 |
| Ex. F. 12 | Pentaethylenehexamine | 1,2-epoxyhexadecane | 2 |
| Ex. F. 13 | Pentaethylenehexamine | 1,2-epoxyhexadecane | 3 |
| Ex. F. 14 | Pentaethylenehexamine | 1,2-Epoxyhexadecane | 4 |
| Ex. F. 15 | Pentaethylenehexamine | C12-C14 alkyl glycidyl ether | 2 |
| Ex. F. 16 | Pentaethylenehexamine | 1,2-epoxydodecane | 2 |
| Ex. F. 17 | Pentaethylenehexamine | 1,2-epoxydodecane | 1 |
| Ex. F. 18 | Diethylenetriamine | 1,2-epoxyhexadecane | 3 |
| Ex. F. 19 | Tetraethylenepentamine | C12-C14 alkyl glycidyl ether | 3 |

TABLE 6-continued

| Examples Formulas 2-22 | | | |
|---|---|---|---|
| Formula | Amine | Epoxide | Epoxide:Amine Ratio |
| Ex. F. 20 | Tetraethylenepentamine | C12-C14 alkyl glycidyl ether | 5 |
| Ex. F. 21 | Tetraethylenepentamine | C12-C14 alkyl glycidyl ether | 4 |
| Ex. F. 22 | Tetraethylenepentamine | C12-C14 alkyl glycidyl ether | 2 |

Example 2

Following the generation of the amine epoxide adducts according to Example Formulas 1-22, the various amine epoxide adducts were evaluated for their softening efficacy in comparison to a commercially available, commonly used quaternary ammonium softening composition. Softening efficacy was evaluated in terms of resilience, softness, and smoothness.

The results of this evaluation are shown in Table 7 below.

TABLE 7

| Formula | Amine | Epoxide | Epoxide: Amine Ratio | Average R Group Length | Resilience | Softness | Smoothness |
|---|---|---|---|---|---|---|---|
| Ex. F. 7 | Pentaethylenehexamine | 1,2-epoxydodecane | 3 | 12 | 51.7845 | 63.1296 | 51.7199 |
| Ex. F. 7 | Pentaethylenehexamine | 1,2-epoxydodecane | 3 | 12 | 51.1568 | 63.4881 | 51.7985 |
| Ex. F. 7 | Pentaethylenehexamine | 1,2-epoxydodecane | 3 | 12 | 52.4579 | 63.2147 | 51.6053 |
| Ex. F. 7 | Pentaethylenehexamine | 1,2-epoxydodecane | 3 | 12 | 53.9276 | 62.7676 | 51.4212 |
| Ex. F. 8 | Pentaethylenehexamine | 1,2-epoxydodecane | 4 | 12 | 51.4447 | 64.2202 | 52.2223 |
| Ex. F. 8 | Pentaethylenehexamine | 1,2-epoxydodecane | 4 | 12 | 50.8637 | 63.8495 | 51.3974 |
| Ex. F. 8 | Pentaethylenehexamine | 1,2-epoxydodecane | 4 | 12 | 52.3318 | 63.5489 | 51.7909 |
| Ex. F. 8 | Pentaethylenehexamine | 1,2-epoxydodecane | 4 | 12 | 53.0757 | 63.2498 | 51.8478 |
| Ex. F. 11 | Pentaethylenehexamine | 1,2-epoxytetradecane | 2 | 14 | 52.1094 | 63.9754 | 51.7794 |
| Ex. F. 11 | Pentaethylenehexamine | 1,2-epoxytetradecane | 2 | 14 | 51.9142 | 63.762 | 51.8316 |
| Ex. F. 11 | Pentaethylenehexamine | 1,2-epoxytetradecane | 2 | 14 | 52.9707 | 63.6379 | 51.9147 |
| Ex. F. 11 | Pentaethylenehexamine | 1,2-epoxytetradecane | 2 | 14 | 52.4285 | 63.5953 | 51.7795 |
| Ex. F. 12 | Pentaethylenehexamine | 1,2-epoxyhexadecane | 2 | 16 | 52.0411 | 63.1339 | 51.5737 |
| Ex. F. 12 | Pentaethylenehexamine | 1,2-epoxyhexadecane | 2 | 16 | 51.6374 | 63.3005 | 51.869 |
| Ex. F. 12 | Pentaethylenehexamine | 1,2-epoxyhexadecane | 2 | 16 | 49.935 | 63.7283 | 51.5033 |
| Ex. F. 12 | Pentaethylenehexamine | 1,2-epoxyhexadecane | 2 | 16 | 50.2642 | 63.8995 | 51.733 |
| Ex. F. 13 | Pentaethylenehexamine | 1,2-epoxyhexadecane | 3 | 16 | 49.3289 | 65.1507 | 52.1022 |
| Ex. F. 13 | Pentaethylenehexamine | 1,2-epoxyhexadecane | 3 | 16 | 48.8418 | 64.9907 | 51.8242 |
| Ex. F. 13 | Pentaethylenehexamine | 1,2-epoxyhexadecane | 3 | 16 | 49.9866 | 64.4326 | 51.7012 |
| Ex. F. 13 | Pentaethylenehexamine | 1,2-epoxyhexadecane | 3 | 16 | 49.7535 | 64.6252 | 51.8984 |
| Ex. F. 14 | Pentaethylenehexamine | 1,2-Epoxyhexadecane | 4 | 16 | 49.7535 | 64.6252 | 51.8984 |
| Ex. F. 14 | Pentaethylenehexamine | 1,2-Epoxyhexadecane | 4 | 16 | 54.0746 | 62.5999 | 51.5969 |
| Ex. F. 14 | Pentaethylenehexamine | 1,2-Epoxyhexadecane | 4 | 16 | 51.9348 | 63.1411 | 51.3116 |
| Ex. F. 14 | Pentaethylenehexamine | 1,2-Epoxyhexadecane | 4 | 16 | 53.8862 | 62.263 | 51.4267 |
| Ex. F. 10 | Tetraethylenepentamine | 1,2-Epoxytetradecane | 3 | 14 | 48.7231 | 64.405 | 51.4204 |
| Ex. F. 10 | Tetraethylenepentamine | 1,2-Epoxytetradecane | 3 | 14 | 49.104 | 63.7941 | 51.2188 |
| Ex. F. 10 | Tetraethylenepentamine | 1,2-Epoxytetradecane | 3 | 14 | 52.0098 | 63.8305 | 51.6209 |
| Ex. F. 10 | Tetraethylenepentamine | 1,2-Epoxytetradecane | 3 | 14 | 49.2057 | 64.3471 | 51.5918 |
| Ex. F. 9 | Tetraethylenepentamine | 1,2-Epoxytetradecane | 2 | 14 | 60.265 | 60.8929 | 51.6826 |
| Ex. F. 9 | Tetraethylenepentamine | 1,2-Epoxytetradecane | 2 | 14 | 59.4142 | 60.9094 | 51.4806 |
| Ex. F. 9 | Tetraethylenepentamine | 1,2-Epoxytetradecane | 2 | 14 | 60.9104 | 60.7493 | 51.6573 |
| Ex. F. 9 | Tetraethylenepentamine | 1,2-Epoxytetradecane | 2 | 14 | 61.0019 | 60.3475 | 51.4331 |
| Ex. F. 15 | Pentaethylenehexamine | C12-C14 alkyl glycidyl ether | 2 | 13 | 55.3627 | 61.6519 | 51.4999 |
| Ex. F. 15 | Pentaethylenehexamine | C12-C14 alkyl glycidyl ether | 2 | 13 | 55.3116 | 61.7643 | 51.538 |
| Ex. F. 15 | Pentaethylenehexamine | C12-C14 alkyl glycidyl ether | 2 | 13 | 56.5764 | 61.2476 | 51.4625 |
| Ex. F. 15 | Pentaethylenehexamine | C12-C14 alkyl glycidyl ether | 2 | 13 | 56.8985 | 61.6084 | 51.749 |
| Ex. F. 1 | Pentaethylenehexamine | C12-C14 alkyl glycidyl ether | 3 | 13 | 54.3731 | 62.5042 | 51.7528 |
| Ex. F. 1 | Pentaethylenehexamine | C12-C14 alkyl glycidyl ether | 3 | 13 | 54.6619 | 62.5306 | 51.5519 |
| Ex. F. 1 | Pentaethylenehexamine | C12-C14 alkyl glycidyl ether | 3 | 13 | 54.7027 | 62.034 | 51.3761 |
| Ex. F. 1 | Pentaethylenehexamine | C12-C14 alkyl glycidyl ether | 3 | 13 | 54.2015 | 62.5161 | 51.6097 |
| Ex. F. 2 | Pentaethylenehexamine | C12-C14 alkyl glycidyl ether | 4 | 13 | 53.1994 | 62.8629 | 51.6063 |
| Ex. F. 2 | Pentaethylenehexamine | C12-C14 alkyl glycidyl ether | 4 | 13 | 53.2868 | 62.3831 | 51.393 |
| Ex. F. 2 | Pentaethylenehexamine | C12-C14 alkyl glycidyl ether | 4 | 13 | 54.8189 | 61.3538 | 51.178 |
| Ex. F. 2 | Pentaethylenehexamine | C12-C14 alkyl glycidyl ether | 4 | 13 | 54.6361 | 62.1041 | 51.7108 |
| Ex. F. 16 | Pentaethylenehexamine | 1,2-epoxydodecane | 2 | 12 | 50.9775 | 64.4737 | 52.0464 |
| Ex. F. 16 | Pentaethylenehexamine | 1,2-epoxydodecane | 2 | 12 | 51.4516 | 63.6412 | 52.1337 |
| Ex. F. 16 | Pentaethylenehexamine | 1,2-epoxydodecane | 2 | 12 | 51.721 | 64.0887 | 51.9397 |
| Ex. F. 16 | Pentaethylenehexamine | 1,2-epoxydodecane | 2 | 12 | 50.5259 | 64.032 | 51.9279 |
| Ex. F. 17 | Pentaethylenehexamine | 1,2-epoxydodecane | 1 | 12 | 52.9784 | 62.8108 | 51.6585 |
| Ex. F. 17 | Pentaethylenehexamine | 1,2-epoxydodecane | 1 | 12 | 52.5097 | 62.8705 | 52.053 |
| Ex. F. 17 | Pentaethylenehexamine | 1,2-epoxydodecane | 1 | 12 | 55.0503 | 62.1184 | 52.0062 |
| Ex. F. 17 | Pentaethylenehexamine | 1,2-epoxydodecane | 1 | 12 | 56.2094 | 61.6194 | 51.7608 |
| Ex. F. 20 | Tetraethylenepentamine | C12-C14 alkyl glycidyl ether | 5 | 13 | 54.472 | 62.1739 | 51.5894 |
| Ex. F. 20 | Tetraethylenepentamine | C12-C14 alkyl glycidyl ether | 5 | 13 | 54.7967 | 62.1086 | 51.8715 |
| Ex. F. 20 | Tetraethylenepentamine | C12-C14 alkyl glycidyl ether | 5 | 13 | 53.971 | 62.2428 | 51.7453 |
| Ex. F. 20 | Tetraethylenepentamine | C12-C14 alkyl glycidyl ether | 5 | 13 | 54.8036 | 62.5893 | 51.7647 |

TABLE 7-continued

| Formula | Amine | Epoxide | Epoxide: Amine Ratio | Average R Group Length | Resilience | Softness | Smoothness |
|---|---|---|---|---|---|---|---|
| Ex. F. 21 | Tetraethylenepentamine | C12-C14 alkyl glycidyl ether | 4 | 13 | 52.0821 | 62.7463 | 51.6542 |
| Ex. F. 21 | Tetraethylenepentamine | C12-C14 alkyl glycidyl ether | 4 | 13 | 52.127 | 62.9528 | 51.5434 |
| Ex. F. 21 | Tetraethylenepentamine | C12-C14 alkyl glycidyl ether | 4 | 13 | 53.8913 | 62.3942 | 52.0082 |
| Ex. F. 21 | Tetraethylenepentamine | C12-C14 alkyl glycidyl ether | 4 | 13 | 54.7246 | 62.0327 | 51.5442 |
| Ex. F. 19 | Tetraethylenepentamine | C12-C14 alkyl glycidyl ether | 3 | 13 | 48.7951 | 64.9418 | 51.8788 |
| Ex. F. 19 | Tetraethylenepentamine | C12-C14 alkyl glycidyl ether | 3 | 13 | 50.8511 | 64.0321 | 51.9401 |
| Ex. F. 19 | Tetraethylenepentamine | C12-C14 alkyl glycidyl ether | 3 | 13 | 50.032 | 63.9457 | 51.8941 |
| Ex. F. 19 | Tetraethylenepentamine | C12-C14 alkyl glycidyl ether | 3 | 13 | 50.3115 | 64.5176 | 51.9884 |
| Ex. F. 22 | Tetraethylenepentamine | C12-C14 alkyl glycidyl ether | 2 | 13 | 55.32 | 62.1998 | 51.9609 |
| Ex. F. 7 | Pentaethylenehexamine | 1,2-epoxydodecane | 3 | 12 | 51.7845 | 63.1296 | 51.7199 |
| Ex. F. 7 | Pentaethylenehexamine | 1,2-epoxydodecane | 3 | 12 | 51.1568 | 63.4881 | 51.7985 |
| Ex. F. 7 | Pentaethylenehexamine | 1,2-epoxydodecane | 3 | 12 | 52.4579 | 63.2147 | 51.6053 |
| Ex. F. 7 | Pentaethylenehexamine | 1,2-epoxydodecane | 3 | 12 | 53.9276 | 62.7676 | 51.4212 |
| Ex. F. 8 | Pentaethylenehexamine | 1,2-epoxydodecane | 4 | 12 | 51.4447 | 64.2202 | 52.2223 |
| Ex. F. 8 | Pentaethylenehexamine | 1,2-epoxydodecane | 4 | 12 | 50.8637 | 63.8495 | 51.3974 |
| Ex. F. 8 | Pentaethylenehexamine | 1,2-epoxydodecane | 4 | 12 | 52.3318 | 63.5489 | 51.7909 |
| Ex. F. 8 | Pentaethylenehexamine | 1,2-epoxydodecane | 4 | 12 | 53.0757 | 63.2498 | 51.8478 |
| Ex. F. 11 | Pentaethylenehexamine | 1,2-epoxytetradecane | 2 | 14 | 52.1094 | 63.9754 | 51.7794 |
| Ex. F. 11 | Pentaethylenehexamine | 1,2-epoxytetradecane | 2 | 14 | 51.9142 | 63.762 | 51.8316 |
| Ex. F. 11 | Pentaethylenehexamine | 1,2-epoxytetradecane | 2 | 14 | 52.9707 | 63.6379 | 51.9147 |
| Ex. F. 11 | Pentaethylenehexamine | 1,2-epoxytetradecane | 2 | 14 | 52.4285 | 63.5953 | 51.7795 |
| Ex. F. 12 | Pentaethylenehexamine | 1,2-epoxyhexadecane | 2 | 16 | 52.0411 | 63.1339 | 51.5737 |
| Ex. F. 12 | Pentaethylenehexamine | 1,2-epoxyhexadecane | 2 | 16 | 51.6374 | 63.3005 | 51.869 |
| Ex. F. 12 | Pentaethylenehexamine | 1,2-epoxyhexadecane | 2 | 16 | 49.935 | 63.7283 | 51.5033 |
| Ex. F. 12 | Pentaethylenehexamine | 1,2-epoxyhexadecane | 2 | 16 | 50.2642 | 63.8995 | 51.733 |
| Ex. F. 13 | Pentaethylenehexamine | 1,2-epoxyhexadecane | 3 | 16 | 49.3289 | 65.1507 | 52.1022 |
| Ex. F. 13 | Pentaethylenehexamine | 1,2-epoxyhexadecane | 3 | 16 | 48.8418 | 64.9907 | 51.8242 |
| Ex. F. 13 | Pentaethylenehexamine | 1,2-epoxyhexadecane | 3 | 16 | 49.9866 | 64.4326 | 51.7012 |
| Ex. F. 13 | Pentaethylenehexamine | 1,2-epoxyhexadecane | 3 | 16 | 49.7535 | 64.6252 | 51.8984 |
| Ex. F. 14 | Pentaethylenehexamine | 1,2-Epoxyhexadecane | 4 | 16 | 49.7535 | 64.6252 | 51.8984 |
| Ex. F. 14 | Pentaethylenehexamine | 1,2-Epoxyhexadecane | 4 | 16 | 54.0746 | 62.5999 | 51.5969 |
| Ex. F. 14 | Pentaethylenehexamine | 1,2-Epoxyhexadecane | 4 | 16 | 51.9348 | 63.1411 | 51.3116 |
| Ex. F. 14 | Pentaethylenehexamine | 1,2-Epoxyhexadecane | 4 | 16 | 53.8862 | 62.263 | 51.4267 |
| Ex. F. 10 | Tetraethylenepentamine | 1,2-Epoxytetradecane | 3 | 14 | 48.7231 | 64.405 | 51.4204 |
| Ex. F. 10 | Tetraethylenepentamine | 1,2-Epoxytetradecane | 3 | 14 | 49.104 | 63.7941 | 51.2188 |
| Ex. F. 10 | Tetraethylenepentamine | 1,2-Epoxytetradecane | 3 | 14 | 52.0098 | 63.8305 | 51.6209 |
| Ex. F. 10 | Tetraethylenepentamine | 1,2-Epoxytetradecane | 3 | 14 | 49.2057 | 64.3471 | 51.5918 |
| Ex. F. 9 | Tetraethylenepentamine | 1,2-Epoxytetradecane | 2 | 14 | 60.265 | 60.8929 | 51.6826 |
| Ex. F. 9 | Tetraethylenepentamine | 1,2-Epoxytetradecane | 2 | 14 | 59.4142 | 60.9094 | 51.4806 |
| Ex. F. 9 | Tetraethylenepentamine | 1,2-Epoxytetradecane | 2 | 14 | 60.9104 | 60.7493 | 51.6573 |
| Ex. F. 9 | Tetraethylenepentamine | 1,2-Epoxytetradecane | 2 | 14 | 61.0019 | 60.3475 | 51.4331 |
| Ex. F. 15 | Pentaethylenehexamine | C12-C14 alkyl glycidyl ether | 2 | 13 | 55.3627 | 61.6519 | 51.4999 |
| Ex. F. 15 | Pentaethylenehexamine | C12-C14 alkyl glycidyl ether | 2 | 13 | 55.3116 | 61.7643 | 51.538 |
| Ex. F. 15 | Pentaethylenehexamine | C12-C14 alkyl glycidyl ether | 2 | 13 | 56.5764 | 61.2476 | 51.4625 |
| Ex. F. 15 | Pentaethylenehexamine | C12-C14 alkyl glycidyl ether | 2 | 13 | 56.8985 | 61.6084 | 51.749 |
| Ex. F. 1 | Pentaethylenehexamine | C12-C14 alkyl glycidyl ether | 3 | 13 | 54.3731 | 62.5042 | 51.7528 |
| Ex. F. 1 | Pentaethylenehexamine | C12-C14 alkyl glycidyl ether | 3 | 13 | 54.6619 | 62.5306 | 51.5519 |
| Ex. F. 1 | Pentaethylenehexamine | C12-C14 alkyl glycidyl ether | 3 | 13 | 54.7027 | 62.034 | 51.3761 |
| Ex. F. 1 | Pentaethylenehexamine | C12-C14 alkyl glycidyl ether | 3 | 13 | 54.2015 | 62.5161 | 51.6097 |
| Ex. F. 2 | Pentaethylenehexamine | C12-C14 alkyl glycidyl ether | 4 | 13 | 53.1994 | 62.8629 | 51.6063 |
| Ex. F. 2 | Pentaethylenehexamine | C12-C14 alkyl glycidyl ether | 4 | 13 | 53.2868 | 62.3831 | 51.393 |
| Ex. F. 2 | Pentaethylenehexamine | C12-C14 alkyl glycidyl ether | 4 | 13 | 54.8189 | 61.3538 | 51.178 |
| Ex. F. 2 | Pentaethylenehexamine | C12-C14 alkyl glycidyl ether | 4 | 13 | 54.6361 | 62.1041 | 51.7108 |
| Ex. F. 16 | Pentaethylenehexamine | 1,2-epoxydodecane | 2 | 12 | 50.9775 | 64.4737 | 52.0464 |
| Ex. F. 16 | Pentaethylenehexamine | 1,2-epoxydodecane | 2 | 12 | 51.4516 | 63.6412 | 52.1337 |
| Ex. F. 16 | Pentaethylenehexamine | 1,2-epoxydodecane | 2 | 12 | 51.721 | 64.0887 | 51.9397 |
| Ex. F. 16 | Pentaethylenehexamine | 1,2-epoxydodecane | 2 | 12 | 50.5259 | 64.032 | 51.9279 |
| Ex. F. 17 | Pentaethylenehexamine | 1,2-epoxydodecane | 1 | 12 | 52.9784 | 62.8108 | 51.6585 |
| Ex. F. 17 | Pentaethylenehexamine | 1,2-epoxydodecane | 1 | 12 | 52.5097 | 62.8705 | 52.053 |
| Ex. F. 17 | Pentaethylenehexamine | 1,2-epoxydodecane | 1 | 12 | 55.0503 | 62.1184 | 52.0062 |
| Ex. F. 17 | Pentaethylenehexamine | 1,2-epoxydodecane | 1 | 12 | 56.2094 | 61.6194 | 51.7608 |
| Ex. F. 20 | Tetraethylenepentamine | C12-C14 alkyl glycidyl ether | 5 | 13 | 54.472 | 62.1739 | 51.5894 |
| Ex. F. 20 | Tetraethylenepentamine | C12-C14 alkyl glycidyl ether | 5 | 13 | 54.7967 | 62.1086 | 51.8715 |
| Ex. F. 20 | Tetraethylenepentamine | C12-C14 alkyl glycidyl ether | 5 | 13 | 53.971 | 62.2428 | 51.7453 |
| Ex. F. 20 | Tetraethylenepentamine | C12-C14 alkyl glycidyl ether | 5 | 13 | 54.8036 | 62.5893 | 51.7647 |
| Ex. F. 21 | Tetraethylenepentamine | C12-C14 alkyl glycidyl ether | 4 | 13 | 52.0821 | 62.7463 | 51.6542 |
| Ex. F. 21 | Tetraethylenepentamine | C12-C14 alkyl glycidyl ether | 4 | 13 | 52.127 | 62.9528 | 51.5434 |
| Ex. F. 21 | Tetraethylenepentamine | C12-C14 alkyl glycidyl ether | 4 | 13 | 53.8913 | 62.3942 | 52.0082 |
| Ex. F. 21 | Tetraethylenepentamine | C12-C14 alkyl glycidyl ether | 4 | 13 | 54.7246 | 62.0327 | 51.5442 |
| Ex. F. 19 | Tetraethylenepentamine | C12-C14 alkyl glycidyl ether | 3 | 13 | 48.7951 | 64.9418 | 51.8788 |
| Ex. F. 19 | Tetraethylenepentamine | C12-C14 alkyl glycidyl ether | 3 | 13 | 50.8511 | 64.0321 | 51.9401 |
| Ex. F. 19 | Tetraethylenepentamine | C12-C14 alkyl glycidyl ether | 3 | 13 | 50.032 | 63.9457 | 51.8941 |
| Ex. F. 19 | Tetraethylenepentamine | C12-C14 alkyl glycidyl ether | 3 | 13 | 50.3115 | 64.5176 | 51.9884 |
| Ex. F. 22 | Tetraethylenepentamine | C12-C14 alkyl glycidyl ether | 2 | 13 | 55.32 | 62.1998 | 51.9609 |
| Ex. F. 22 | Tetraethylenepentamine | C12-C14 alkyl glycidyl ether | 2 | 13 | 52.9258 | 63.2371 | 51.857 |
| Ex. F. 22 | Tetraethylenepentamine | C12-C14 alkyl glycidyl ether | 2 | 13 | 52.5808 | 63.2487 | 51.8138 |

TABLE 7-continued

| Formula | Amine | Epoxide | Epoxide: Amine Ratio | Average R Group Length | Resilience | Softness | Smoothness |
|---|---|---|---|---|---|---|---|
| Ex. F. 22 | Tetraethylenepentamine | C12-C14 alkyl glycidyl ether | 2 | 13 | 55.6959 | 62.2293 | 52.1218 |
| Ex. F. 18 | Diethylenetriamine | 1,2-epoxyhexadecane | 3 | 16 | 50.0764 | 64.1933 | 51.9437 |
| Ex. F. 18 | Diethylenetriamine | 1,2-epoxyhexadecane | 3 | 16 | 50.4577 | 64.159 | 51.9537 |
| Ex. F. 18 | Diethylenetriamine | 1,2-epoxyhexadecane | 3 | 16 | 50.9906 | 63.3802 | 51.9174 |
| Ex. F. 18 | Diethylenetriamine | 1,2-epoxyhexadecane | 3 | 16 | 49.5957 | 64.0529 | 51.6913 |
| Ex. F. 5 | Diethylenetriamine | C12-C14 alkyl glycidyl ether | 3 | 13 | 54.0239 | 62.1209 | 51.2399 |
| Ex. F. 5 | Diethylenetriamine | C12-C14 alkyl glycidyl ether | 3 | 13 | 55.7188 | 61.6636 | 51.5073 |
| Ex. F. 5 | Diethylenetriamine | C12-C14 alkyl glycidyl ether | 3 | 13 | 54.3442 | 62.2817 | 51.4874 |
| Ex. F. 5 | Diethylenetriamine | C12-C14 alkyl glycidyl ether | 3 | 13 | 55.6951 | 61.9205 | 51.7121 |
| Ex. F. 6 | Diethylenetriamine | C12-C14 alkyl glycidyl ether | 4 | 13 | 55.2051 | 61.5401 | 52.0612 |
| Ex. F. 6 | Diethylenetriamine | C12-C14 alkyl glycidyl ether | 4 | 13 | 56.0252 | 61.7373 | 51.9786 |
| Ex. F. 6 | Diethylenetriamine | C12-C14 alkyl glycidyl ether | 4 | 13 | 55.6986 | 61.4354 | 51.8009 |
| Ex. F. 6 | Diethylenetriamine | C12-C14 alkyl glycidyl ether | 4 | 13 | 56.3618 | 61.4845 | 51.7567 |
| Ex. F. 3 | Ethyleneamine E-100 | C12-C14 alkyl glycidyl ether | 2 | 13 | 53.1178 | 62.9498 | 51.7971 |
| Ex. F. 3 | Ethyleneamine E-100 | C12-C14 alkyl glycidyl ether | 2 | 13 | 53.5559 | 62.4974 | 51.9617 |
| Ex. F. 3 | Ethyleneamine E-100 | C12-C14 alkyl glycidyl ether | 2 | 13 | 54.023 | 62.5199 | 51.8363 |
| Ex. F. 3 | Ethyleneamine E-100 | C12-C14 alkyl glycidyl ether | 2 | 13 | 55.1813 | 62.3656 | 51.9148 |
| Ex. F. 4 | Ethyleneamine E-100 | C12-C14 alkyl glycidyl ether | 3 | 13 | 53.4254 | 62.8205 | 51.9747 |
| Ex. F. 4 | Ethyleneamine E-100 | C12-C14 alkyl glycidyl ether | 3 | 13 | 53.8751 | 62.9096 | 51.9905 |
| Ex. F. 4 | Ethyleneamine E-100 | C12-C14 alkyl glycidyl ether | 3 | 13 | 53.3816 | 62.7571 | 51.5554 |
| Ex. F. 4 | Ethyleneamine E-100 | C12-C14 alkyl glycidyl ether | 3 | 13 | 52.7405 | 62.7 | 51.3641 |
| | No Treatment | No Treatment | 0 | 0 | 62.5026 | 58.4787 | 50.6994 |

Example 3

Using the methods of Example 2, Example Formulas 8, 10, 13, 16, and 18-19 were evaluated for their ability to soften textiles in comparison to textiles receiving no treatment, and textiles treated with a commercially available TEA Esterquat.

The results of this evaluation are shown in FIG. 1. FIG. 1 indicates that a wide range of amine oligomer chain length provide substantially similar or improved performance compared to a traditional esterquat fabric softener. These results are surprising because although it is difficult to replicate the high softening performance of quaternary ammonium fabric softeners, the amine epoxide adducts provide excellent softening efficacy.

Example 4

Using the methods of Example 2, Example Formulas 1-22 were evaluated for their ability to soften textiles based on both their amine count and the epoxide:amine ratio. An untreated control was used to establish a baseline. The results of this evaluation are shown in FIG. 2.

Figure 2:
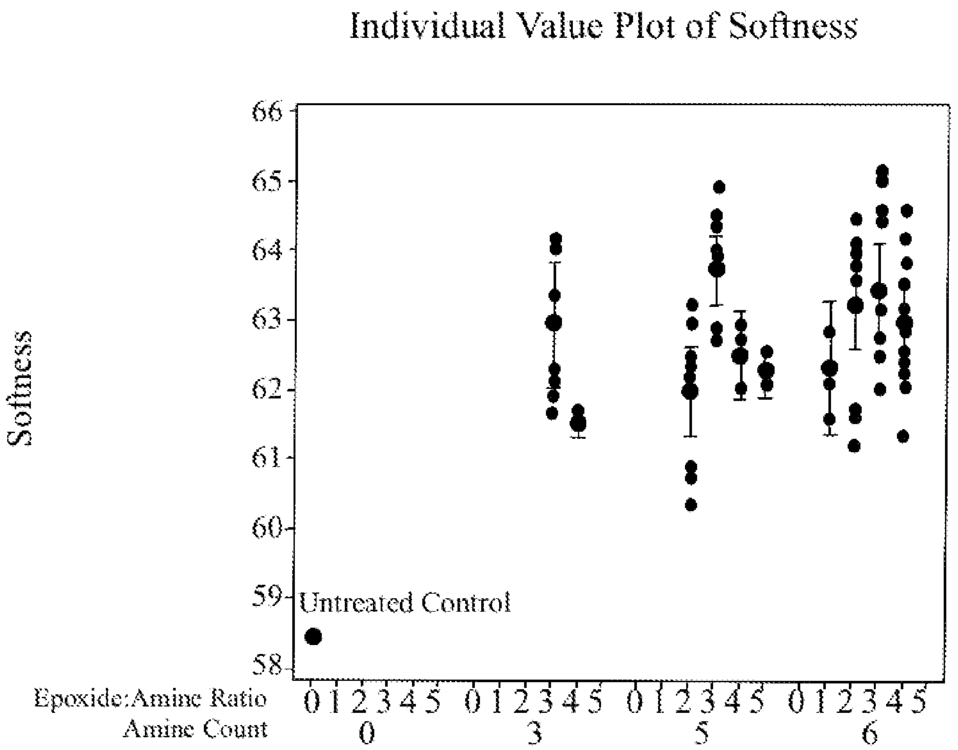
FIG. 2 shows the effective of the amine:epoxide ratio on softening efficacy.

FIG. 2 indicates that both 1:1 and 1:5 amine:ratios provide good softening efficacy, while 1:2 and 1:3 amine:epoxide ratios are preferred.

Example 5

Figure 3:
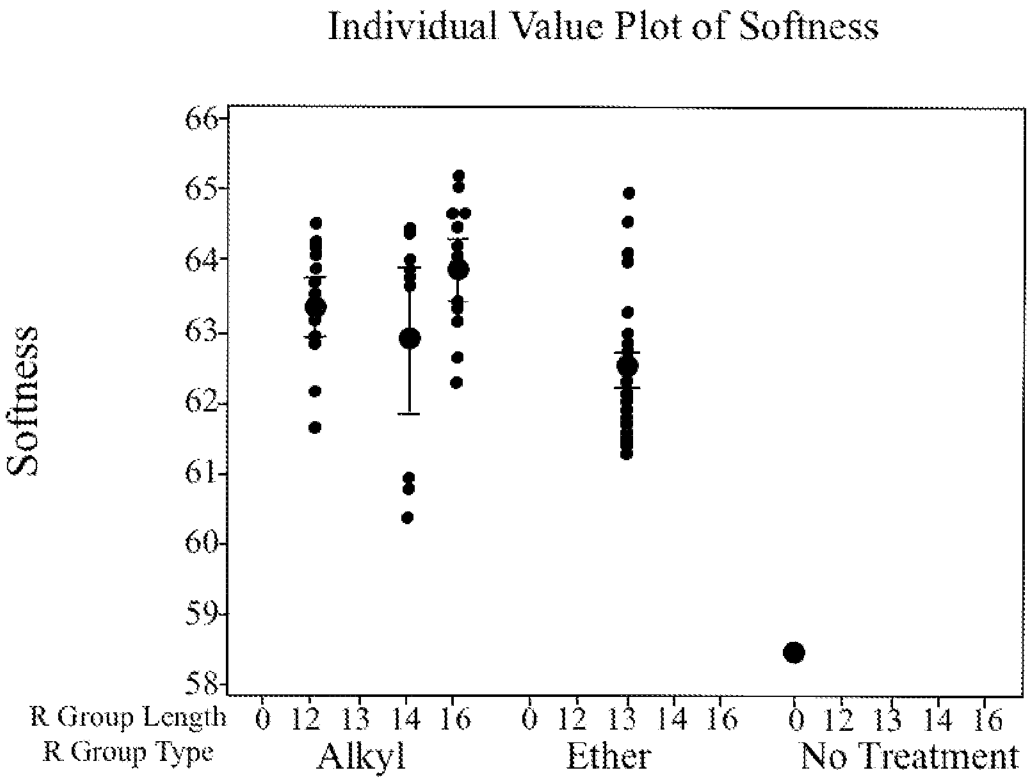
FIG. 3 depicts the effect of the epoxide R-group length on softening efficacy.

Using the methods of Example 2, Example Formulas 1-22 were evaluated for their ability to soften textiles based on the epoxide R-group length and R-group type. An untreated control was used to establish a baseline. The results of this evaluation are shown in FIG. 3.

FIG. 2 indicates that both linear alkyl epoxides and alkyl ether epoxides provide good softening efficacy. Linear alkyl epoxides provide still further improved softening efficacy and thus preferred.

Example 6

The extent to which the compositions provide effective softening for tissue paper was also assessed. Four amine epoxide adducts (Ex F.10, Ex F.16, Ex F.13 and Ex F.14) were evaluated in handsheet studies to determine their impact on the tensile strength loss, comparing with industry standards, Arosurf® PA844, Tego® XP 32186 (available from Evonik Industries), and Stepantex® VL90A (available from Stepan Company).

Handsheets were prepared using a Rapid-Kothen sheet former according to TAPPI procedure T205. This procedure is useful for describing the property of a given pulp and its traits when formed into a paper. A dry lap pulp specimen comprising 70% eucalyptus and 30% softwood was obtained. The pulp specimen was diluted to 2000 mL with water at 20±2° C. and disintegrated using a disintegrator until all fiber bundles were dispersed. 400 mL of the resulting stock was measured out in graduated cylinders. 1% of Example Formulas 10, 13, 14, and 16 as described in Table 6 along with Aerosurf PA844, Tego XP 32186, and Stepantex VL90A were added to different graduated cylinders at doses of 1, 2, and 4 kg/to.d.p. The stock was then used to make sheets using a sheet machine. For each experimental condition, 5 handsheets were prepared with a diameter of 20.2 cm and the corresponding sheet weigh were approximately 1.92 grams resulting in a grammage of 58.6 g/m2. The sheets were then couched, pressed, and dried. More detail regarding formation of handsheets is described in TAPPI procedure T 205, which is herein incorporated by reference in its entirety.

The sheets were equilibrated in the temperature and humidity-controlled room under standard recommendations from TAPPI procedure T 402. In particular, the sheets were placed in a preconditioning chamber and exposed to a preconditioning atmosphere. The sheets were preconditioned for at least 24 hours and stored at a temperature below 25° C., with a relative humidity below 40% but not less than 10%. Further discussion of preconditioning procedures is found in TAPPI procedure T 402, which is herein incorporated by reference in its entirety.

Next, the tensile properties of the sheets were measured according to TAPPI procedure T220, wherein handsheets are tested for their strength and other physical properties. More particularly, the average tensile index was assessed. Tensile strength is indicative of the strength derived from factors such as fiber strength, fiber length, and bonding. Tensile index is the tensile strength in N/m divided by grammage according to the following formula:

$$T1=100(T/R)=36.87(T'R')$$

where T1 is tensile index (N(m/g)), T is tensile strength (kN/m), T' is tensile strength (lbf/in), R is grammage (air dry, g/m$^2$), and R' is mass per unit area (air dry, lb./1000 ft$^2$). It should also be noted that the breaking length in meters is numerically equal to 102 times the tensile index in Nm/g.

Tensile strength was therefore determined using a tensile testing machine, and tensile index was calculated by dividing strength by grammage. Further discussion of these procedures is described in TAPPI procedure T220, which is herein incorporated by reference in its entirety. The results were also averaged and are shown in Table 8.

TABLE 8

Conditions and Tensile Index Values for Tested Chemistries

| Condition | Dose | Average Tensile Index (Nm/g) | Loss in Tensile Strength (%) |
|---|---|---|---|
| Blank | 0 | 19.4 | — |
| Arosurf® PA844 | 1 | 16.9 | 12.9 |
| Arosurf® PA844 | 2 | 15.6 | 19.6 |
| Arosurf® PA844 | 4 | 13.0 | 33.0 |
| Tego ® XP 32186 | 1 | 17.7 | 8.8 |
| Tego ® XP 32186 | 2 | 17.2 | 11.3 |
| Tego ® XP 32186 | 4 | 14.8 | 23.7 |
| Stepantex ® VL90A | 1 | 19.3 | 0.5 |
| Stepantex ® VL90A | 2 | 17.8 | 8.2 |
| Stepantex ® VL90A | 4 | 13.4 | 30.9 |
| Ex F. 10 | 1 | 19.6 | -1.0 |
| Ex F. 10 | 2 | 18.5 | 4.6 |
| Ex F. 10 | 4 | 11.2 | 42.3 |
| Ex F. 16 | 1 | 19.2 | 1.0 |
| Ex F. 16 | 2 | 17.3 | 10.8 |
| Ex F. 16 | 4 | 14.1 | 27.3 |
| Ex F. 13 | 1 | 18.6 | 4.1 |
| Ex F. 13 | 2 | 17.9 | 7.7 |
| Ex F. 13 | 4 | 15.1 | 22.2 |
| Ex F. 14 | 1 | 19.5 | -0.5 |
| Ex F. 14 | 2 | 18.0 | 7.2 |
| Ex F. 14 | 4 | 11.6 | 40.2 |

Considering that a loss of tensile index correlates to an increase in bulk softness of the sheet, Arosurf® PA844 showed the best debonding impact in the investigated doses, which can be observed by the highest tensile loss, being followed by Tego® XP 32186. Stepantex® VL90A provided negligible debonding impact of the sheets when dosed 1 and 2 kg/to.d.p. When dosing 4 kg/to.d.p, Stepantex® VL90A shows comparable tensile strength loss as observed for Arosurf® PA844.

The four evaluated products, Ex F. 10, Ex F.16, Ex F.13 and Ex F.14, for doses 1 and 2 kg/to.d.p., showed negligible impact on tensile strength loss, as observed for Stepantex® VL90A. Ex F. 10 and Ex F.14 at 4 kg/to.d.p. provided equally good debonding, as it can be observed by the comparable tensile strength loss. While Ex F.16 and Ex F.13 at 4 kg/to.d.p. showed similar tensile strength loss as the industrial standard, Tego® XP 32186. Beneficially, the Example Formulas 10, 13, 14, and 16 provide improved bulk softness for the tissue (compared to tissues not treated with the amine epoxide adduct) without substantial tensile strength loss. As used herein, "substantial tensile strength loss" refers to a loss in tensile strength not overall greater than existing commercial softeners, particularly existing softeners comprising quaternary ammonium compounds.

The preferred embodiments being thus described, it will be obvious that the same may be varied in many ways. Such variations are not to be regarded as a departure from the spirit and scope of the disclosure and all such modifications are intended to be included within the scope of the following claims.

What is claimed is:

1. A softened product comprising:

an amine epoxide adduct compound according to the formula:

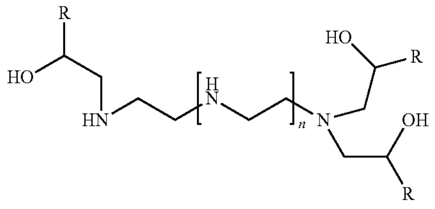

wherein R is an alkyl group or a —$(CH_2)_k$ O-alkyl, and wherein k is an integer between 1-10 and n is an integer of between 1-1000;

a processing aid comprising a non-deliquescent material; and a textile; and wherein the softened product is free of quaternary ammonium compounds, and wherein the amine epoxide adduct compound adheres to the textile.

2. The softened product of claim 1, wherein the amine epoxide adduct is a compound selected from the following formulas:

(X)

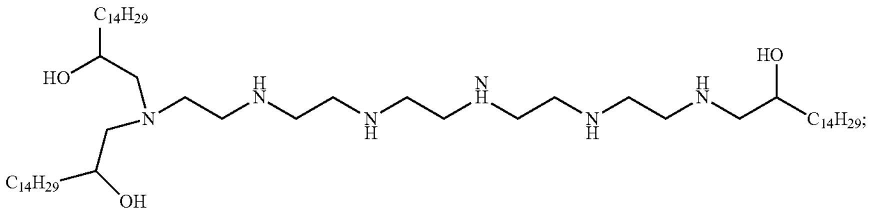

(XI)

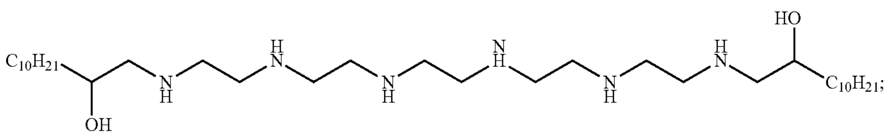

-continued (XII)

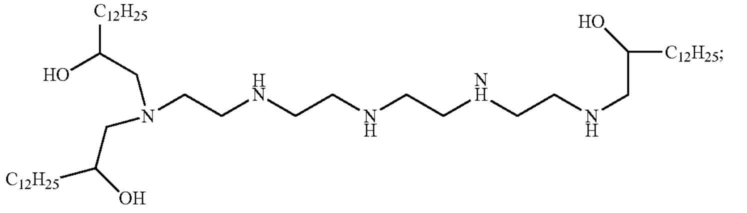

(XIII)

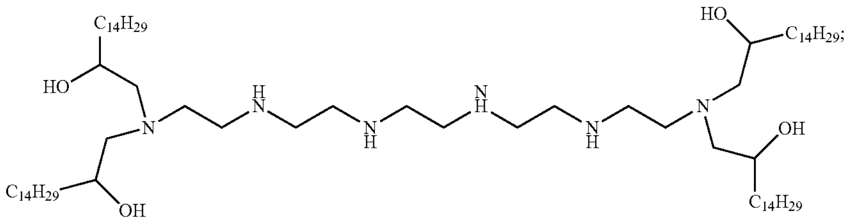

or a combination thereof.

3. The softened product of claim 1, wherein the textile is selected from silk fibers, linen fibers, cotton fibers, hemp fibers, angora fibers, bamboo fibers, polyester fibers, polyamide fibers, nylon, acrylic fibers, acetate fibers, wool, rayon, cashmere, satin, spandex, cotton, polyester, or a combination thereof.

4. The softened product of claim 3, wherein the textile is a fabric used in a hotel, hospital, healthcare facility, restaurant, health club, salon, retail store, or a combination thereof.

5. The softened product of claim 4, wherein the textile is a bed sheet, pillowcase, towel, table linen, tablecloth, bar mop, or uniform.

6. The softened product of claim 1, wherein the softened product comprises from about 10 wt. % to about 80 wt. % of the amine epoxide adduct compound.

7. The softened product of claim 1, wherein the softened product further comprises an additional functional ingredient selected from an alkalinity source, defoaming agent, anti-redeposition agent, solubility modifier, dispersant, stabilizing agent, sequestrant, chelating agent, surfactant, anti-wrinkling agent, optical brightener, dye, rheology modifier, thickener, hydrotrope, coupler, buffer, solvent, enzyme, soil-release agent, dye scavenger, crisping agent, antimicrobial agent, fungicide, antioxidant, or a combination thereof.

8. The softened product of claim 1, wherein the amine epoxide adduct compound comprises a molar ratio of the epoxide to the amine between about 1:20 to about 20:1.

9. The softened product of claim 1, wherein the amine epoxide adduct compound comprises one or more epoxides derived from an alkylene.

10. The softened product of claim 1, wherein the softened product is a solid comprising about 10 wt. % to about 80 wt. % amine epoxide adduct compound and about 0 wt. % to about 10 wt. % processing aid.

11. The softened product of claim 1, wherein the softened product is a liquid comprising about 10 wt. % to about 80 wt. % amine-epoxide adduct compound and about 0 wt. % to about 25 wt. % processing aid.

12. The softened product of claim 1, wherein the amine epoxide adduct is a multiple charged cationic compound having 1, 2, 3, or more positive charges.

13. The softened product of claim 1, wherein the amine epoxide adduct is a multiple charged anionic compound having 1, 2, 3, or more negative charges.

14. The softened product of claim 1, wherein the amine epoxide adduct compound comprises an epoxide consisting of a monoepoxide or a polyepoxide.

15. The softened product of claim 1, the amine epoxide adduct has a hydrophobicity and/or hydrophilicity and the alkyl groups and alkyl have a length of carbon chains, and wherein the length of the carbon chains and/or the amount of epoxides adjusts the hydrophobicity and/or hydrophilicity of the amine epoxide adduct.

16. The softened product of claim 1, wherein the amine used to generate the amine epoxide adduct compound is selected from pentaethylenehexamine, tetraethylenepentamine, diethylenetriamine, ethyleneamine E-100, triethylenetetramine, tris(2-aminoethyl)amine, or a combination thereof.

17. The softened product of claim 1, wherein the epoxide used to generate the amine epoxide adduct compound is selected from 1,2-epoxydodecane, 1,2-epoxytetradecane, 1,2-epoxyhexadecane, $C_{12}$-$C_{14}$ alkyl glycidyl ether, $C_8$-$C_{10}$ alkyl glycidyl ether, 2-ethylhexyl glycidyl ether, Styrene Oxide, or a combination thereof.

18. The softened product of claim 1, wherein the amine epoxide adduct compound is generated at a reaction temperature of between about 90° C. and about 140° C.

19. A method of softening a product comprising:

contacting a first reagent comprising an amine and a second reagent comprising an epoxide to generate an amine epoxide adduct compound according to the formula:

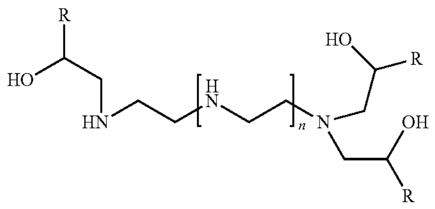

wherein R is an alkyl group or a $—(CH_2)_k$ O-alkyl, and wherein k is an integer between 1-10 and wherein n is an integer of between 1-1000;

forming a mixture comprising the amine epoxide adduct compound and a processing aid comprising a non-deliquescent material; and wherein the mixture is free of quaternary ammonium compounds; and contacting the mixture with a product comprising a textile, wherein the amine epoxide adduct compound adheres to the textile.

20. The method of claim 19, wherein the amine is selected from pentaethylenehexamine, triethylenetetramine, tetraethylenepentamine, diethylenetriamine, hexaethyleneheptamine, or a combination thereof, or wherein the epoxide is selected from 1,2-epoxydodecane, 1,2-epoxytetradecane, 1,2-epoxyhexadecane, 1,2-epoxyoctadecane, a $C_8$-$C_{10}$ alkyl glycidyl ether, a $C_{12}$-$C_{14}$ alkyl glycidyl ether, or a combination thereof.

21. The method of claim 19, wherein the textile is a fabric used in a hotel, hospital, healthcare facility, restaurant, health club, salon, retail store, or a combination thereof.

* * * * *